United States Patent
Kusuyama

(10) Patent No.: US 6,757,106 B2
(45) Date of Patent: *Jun. 29, 2004

(54) OPTICAL LENS, OPTICAL LENS UNIT, STACKED TYPE OPTICAL LENS, OPTICAL SYSTEM AND SEMICONDUCTOR LASER APPARATUS

(75) Inventor: Yutaka Kusuyama, Hamamatsu (JP)

(73) Assignee: Hamamatsu Phonics K.K., Shizuoka (JP)

( * ) Notice: Subject to any disclaimer, the term of this patent is extended or adjusted under 35 U.S.C. 154(b) by 46 days.

This patent is subject to a terminal disclaimer.

(21) Appl. No.: 10/141,338

(22) Filed: May 9, 2002

(65) Prior Publication Data

US 2002/0191296 A1 Dec. 19, 2002

Related U.S. Application Data

(63) Continuation-in-part of application No. PCT/JP00/07953, filed on Nov. 10, 2000, and a continuation-in-part of application No. PCT/JP00/07954, filed on Nov. 10, 2000, and a continuation-in-part of application No. PCT/JP00/07956, filed on Nov. 10, 2000.

(30) Foreign Application Priority Data

Nov. 10, 1999 (JP) .......................................... P11-319847

(51) Int. Cl.$^7$ ............................................. G02B 27/10
(52) U.S. Cl. ...................................... 359/619; 359/621
(58) Field of Search ................................ 359/619–623, 359/628, 454–456, 542, 641

(56) References Cited

U.S. PATENT DOCUMENTS 4,986,939 A   1/1991   Hoffmann ................... 264/1.7

(List continued on next page.)

FOREIGN PATENT DOCUMENTS

| EP | 0 317 153 A1 | 5/1989 |
|---|---|---|
| EP | 1 006 382 A1 | 6/2000 |
| JP | 57-181516 | 11/1982 |
| JP | 58-168026 | 10/1983 |
| JP | 4-284401 | 10/1992 |
| JP | 6-281854 | 10/1994 |
| JP | 7-98402 | 4/1995 |
| JP | 7-287104 | 10/1995 |
| JP | 9-96760 | 4/1997 |
| JP | 9-184997 | 7/1997 |
| WO | WO 99/57791 | 11/1999 |

OTHER PUBLICATIONS

Satoshi Yamaguchi, Special Feature: Laser Beam Technology LD Array Light Concentration using a Prism Array, O plus E, No. 210, 1997, pp. 106–112 (including English-language translation).

*Primary Examiner*—Huy Mai
(74) *Attorney, Agent, or Firm*—Morgan, Lewis & Bockius LLP

(57) ABSTRACT

An optical lens of this invention comprises a first optical member array, in which a plurality of columnar optical members acting on each ray of light emitted from each light-emitting device are arranged in an array, and a second optical member, formed into a columnar shape from transparent material and within which the first optical member array is embedded along the column axis direction; the refractive index of the constituent material of the plurality of columnar optical members is higher than that of the transparent material of the second optical member. Because the first optical member array is embedded in the second optical member in an integral structure, it is possible to easily place the lens in a position such that each incident light ray is acted upon. Further, the protruding and depressed portions due to the curved surfaces of the plurality of columnar optical members are covered by the second optical member and not exposed to the outside, so that there is no accumulation of dirt or the like in these portions, and an optical lens with excellent light emission performance is realized.

35 Claims, 28 Drawing Sheets

U.S. PATENT DOCUMENTS

| | | |
|---|---|---|
| 5,004,328 A | 4/1991 | Suzuki et al. ............... 350/416 |
| 6,185,042 B1 * | 2/2001 | Lomb et al. ................ 359/619 |
| 6,456,436 B2 * | 9/2002 | Miura et al. ................ 359/619 |
| 2002/0089755 A1 * | 7/2002 | Yamazaki et al. .......... 359/623 |
| 2002/0131178 A1 * | 9/2002 | Kusuyama .................. 359/619 |

* cited by examiner

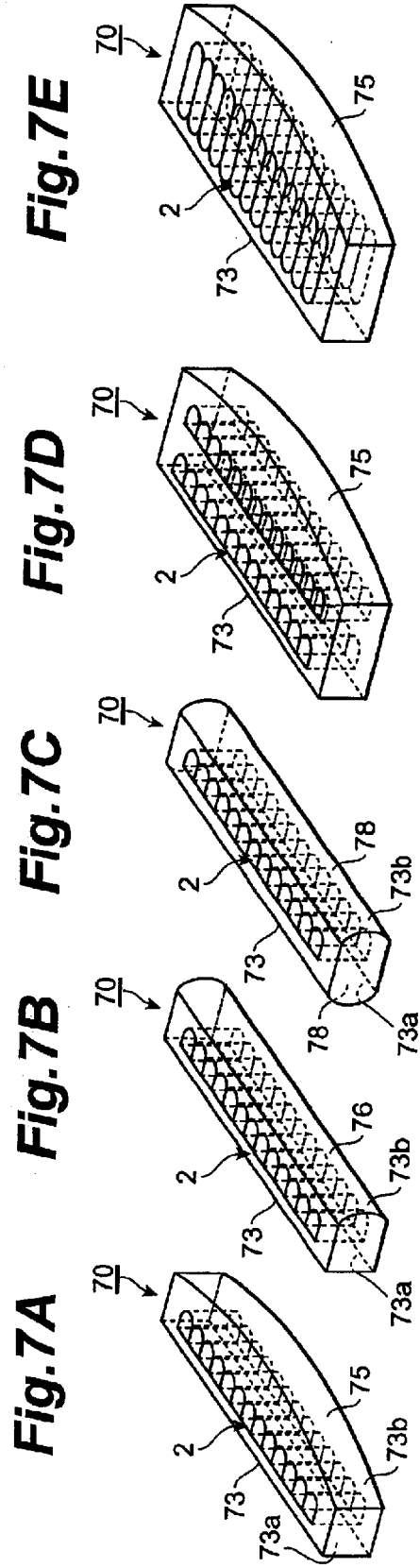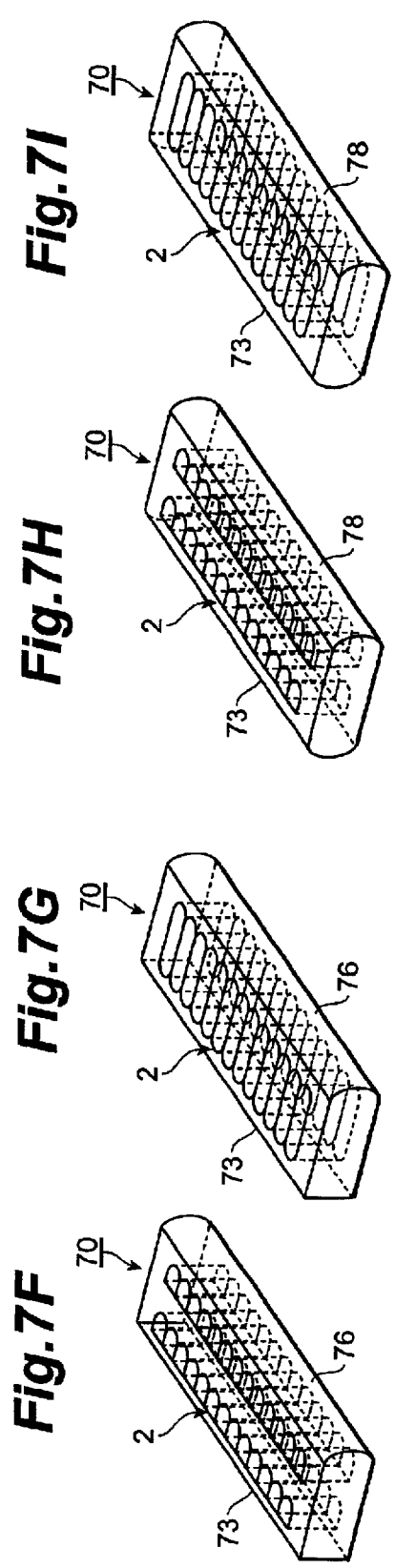

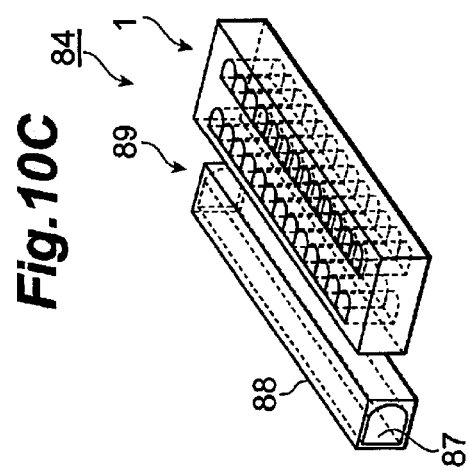
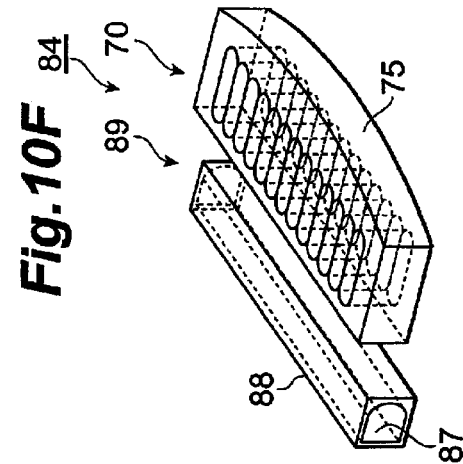
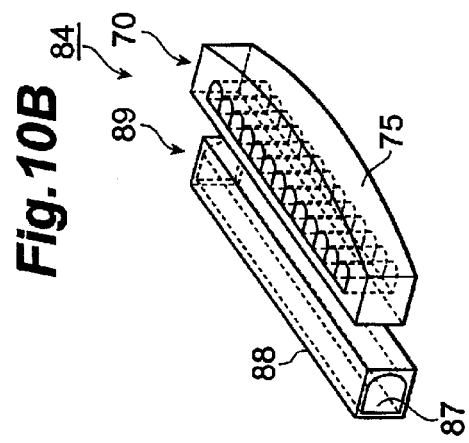
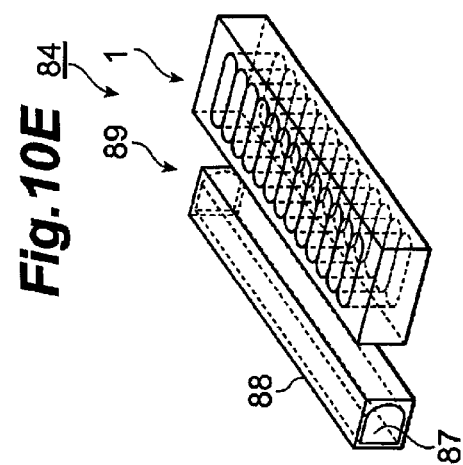
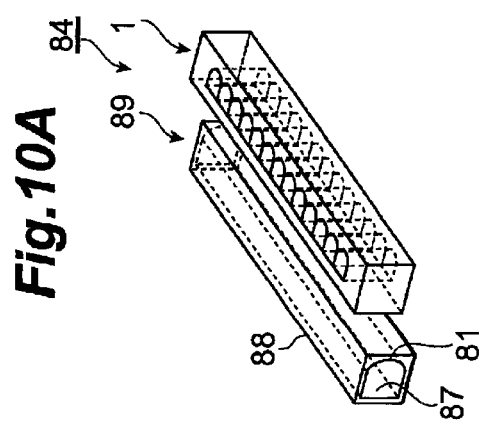
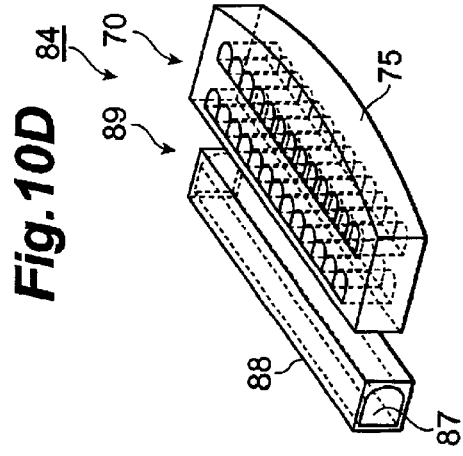

OPTICAL LENS, OPTICAL LENS UNIT, STACKED TYPE OPTICAL LENS, OPTICAL SYSTEM AND SEMICONDUCTOR LASER APPARATUS

RELATED APPLICATION

This application is a continuation-in-part of the International Patent Applications No. PCT/JP00/07953, PCT/JP00/07954, and PCT/JP00/07956, filed Nov. 10, 2000.

BACKGROUND OF THE INVENTION

1. Field of the Invention

This invention relates to an optical lens, optical lens unit, stacked type optical lens, optical system, and semiconductor laser apparatus which act on each of the rays of light emitted from a light-emitting unit which is a plurality of light-emitting devices arranged in an array, and in particular, relates to an optical lens, optical lens unit, stacked type optical lens, optical system, and semiconductor laser apparatus which collimates and condenses each ray of light.

2. Related Background of the Invention

An optical lens collimates (parallelizes) rays emitted from a semiconductor laser device as a light-emitting device, and the light is focused onto a minute spot at the light-receiving portion of an optical fiber or the like. The semiconductor laser device often takes the form of a semiconductor laser array, in which a plurality of light-emitting portions are arranged in a row; in this case, the optical lens also takes the form of an array which collimates each of the rays of light from each of the light-emitting portions. Japanese Patent Laid-open No. H7-98402 discloses an optical path converter in which a plurality of cylindrical lenses are arranged in parallel. International Unexamined Patent No. WO99/57791 and European Unexamined Patent No. EP1006382A1 disclose an optical lens for semiconductor lasers in which a plurality of cylindrical lenses are formed integrally. These optical path converters and cylindrical lenses for optical lenses each collimate rays of light emitted from each of the light-emitting portions of a semiconductor laser array.

SUMMARY OF THE INVENTION

As a result of studies of the above conventional type optical lenses, the inventor of this invention discovered that the above conventional optical lenses have the following problems.

(1) Using the optical path converter disclosed in Japanese Patent Laid-open No. H7-98402, it is extremely difficult to arrange each of the cylindrical lenses to collimate incident rays one-to-one with the light-emitting portions of semiconductor laser devices.

(2) In the optical lenses disclosed in International Unexamined Patent No. WO99/57791 and European Unexamined Patent No. EP1006382A1, cylindrical lenses are formed integrally, so that problems such as in (1) do not occur; but there is the problem that, because the depressions and protrusions of each cylindrical lens are exposed to the outside, dirt tends to accumulate in such places, and this blocks light and affects the light emission performance.

An object of this invention is to provide an optical lens, optical lens unit, stacked type optical lens, optical system, which promote a simple arrangement to a position enabling action on each ray of light emitted from each of a plurality of light-emitting portions of a light-emitting device, the light-emitting portions of which are arranged in an array, and which can adequately prevent adverse effects on the light emission performance, and semiconductor laser apparatus.

In order to attain the above object, the optical lens of this invention is an optical lens which, after acting on each of the rays of light emitted from a light-emitting device the plurality of light-emitting portions of which are arranged in an array, emits the rays of light, and which comprises:

one or a plurality of first optical member arrays, each having a plurality of columnar optical members comprising a first optical action portion, which has a curved surface on either the light incidence side or on the light emission side and which acts on each ray of light emitted from each light-emitting portion in the x-axis direction, and in which each columnar optical member is arranged on the same plane; and, a second optical member, formed in a columnar shape from a transparent material, in the interior of which are embedded in parallel one or two first optical member arrays, along the column axis direction; and, in which the constituent material of each columnar optical member has a refractive index differing from that of the transparent material of the second optical member.

In such an optical lens, because the first optical member array acting on incident light from the light-emitting device is embedded in the second optical member in an integral structure, arrangement in a position to enable action on each of the incident rays of light can be easily performed.

Moreover, because the depressions and protrusions due to the convex curved surfaces of each columnar optical member, formed by arrangement in an array of each columnar optical member, are covered by the second optical member and are not exposed to the outside, there is no accumulation of dirt on these portions.

Further, the first optical member array is reinforced by the second optical member, and so has excellent strength.

In this specification, "acts on a ray of light" means that the angle of divergence of an incident divergent ray of light is reduced before the ray of light exits.

It is desirable that the columnar optical members be in mutual contact in the array arrangement. In this case, the array pitch of the columnar optical members is shorter than in the case in which the plurality of columnar optical members are mutually separated in the array, so that the lens can easily be applied to a semiconductor laser array which is a light-emitting device in which the array pitch of the light-emitting portions is short. Also, each of the first optical action portions of the columnar optical member acts precisely in the X-axis direction on the ray of light emitted from each light-emitting portion.

Each of the columnar optical members has a pair of contact plane surfaces, formed on the side faces and mutually parallel; it is further desirable that the first optical member array be formed with each of the columnar optical members arranged in the array in mutual contact at the contact plane surfaces. By this means, it is easy to form the first optical member array, and the optical lens becomes inexpensive.

Each of the columnar optical members may be formed integrally. When the columnar optical members are formed integrally, the operation of arrangement of the individual columnar optical members becomes unnecessary, and the optical lens can be manufactured efficiently, and the lens so becomes inexpensive.

It is desirable that the second optical member have a curved surface which acts on either incident light or exiting light. The optical lens comprises two optical members capable of acting on light, so that it is possible to manufacture the optical lens where the refractive indices of the two optical members are set appropriately, and in particular so that the refractive index difference is made large. "X-axis direction" means the direction of arrangement of each light-emitting portion in the light-emitting device when the direction of arrangement of the plurality of columnar optical members and the direction of arrangement of the plurality of light-emitting portions are parallel; that is, "X-axis direction" means the direction of arrangement of the plurality of columnar optical members.

For example, the curved surface of the second optical action portion may be formed at the exit face of the second optical member, to act in the X-axis direction on each ray of light emitted from each light-emitting portion. By this means, it is possible to condense each of the rays emitted from the first optical member array.

As the curved surface of the second optical action portion, either the incidence surface or the exit surface of the second optical member is formed into a curved surface, to act in the Y-axis direction on each ray of light emitted from each light-emitting portion. By this means, emitted light is obtained which has been acted on in both directions by the optical lens, in addition to the action in the X-axis direction by the first optical action portion of the columnar optical member. Here, "Y-axis direction" signifies the direction perpendicular to the X-axis direction and to the optical axis.

It is desirable that the thermal expansion coefficient of the constituent material of the columnar optical members be higher than that of the transparent material of the second optical member. If the optical lens is manufactured with a material of high thermal expansion coefficient covered by a material with a low thermal expansion coefficient, a crimping effect results in a durable structure which resists cracking.

It is desirable that the constituent material of columnar optical members have a yield point which is higher than that of the transparent material of the second optical member. The difference in yield points can be utilized to manufacture an embedded type optical lens using a drawing process.

The optical lens unit of this invention comprises the above optical lens, and a juxtaposed optical lens, placed adjacent to the above optical lens, and comprising a third optical action portion which acts in the Y-axis direction on each ray of light emitted from each light-emitting portions. Because the juxtaposed optical lens comprising the third optical action portion is provided separately, it can be placed in a desired position.

In the optical lens unit of this invention, the above optical lenses, each comprising a first optical member array, are arranged into an array of two parallel rows. In such an optical lens unit, the two optical lenses are arranged into two rows, and so it is possible to adjust the distance between the optical action portions in each of the optical lenses.

It is desirable that the second optical member of one of the two rows of optical lenses arranged in parallel is formed with a curved surface at either the light incidence face or the light exiting face of the second optical members, to comprise a second optical action portion which acts in the Y-axis direction on each ray of light emitted from each light-emitting portion.

The first optical member array of the optical lens arranged on the exit side of the two rows of optical lenses arranged in parallel, has a plurality of columnar optical members comprising first optical action portions, with curved surfaces formed on the light incidence side and on the light emission side, and which act on each ray of light emitted from each light-emitting portion. The first optical member array of the optical lens arranged on the incidence side of the two rows of optical lenses arranged in parallel may have a plurality of columnar optical members comprising first optical action portions, with a curved surface formed on the light incidence side, and which act on each ray of light emitted from each light-emitting portion. By means of the optical lens arranged on the incidence side, it is possible to act on light incident from light-emitting devices according to the divergence angle of the light incident from each light-emitting portion and the pitch of the columnar optical members, and to adjust the emitted light.

An optical lens unit of this invention further comprises a juxtaposed optical lens, juxtaposed to two rows of optical lenses arranged in parallel, and comprising a third optical action portion, which acts in the Y-axis direction on each ray of light emitted from each light-emitting portion. Because the juxtaposed optical lens comprising the third optical action portion is provided separately, the juxtaposed optical lens can be placed in a prescribed position.

An optical system of this invention comprises a light-emitting device in which a plurality of light-emitting portions are arranged in an array; the above optical lens, which acts on each ray of light emitted from the light-emitting device; and a light-receiving device, in which one or a plurality of light-receiving portions which receive light emitted from the optical lens are arranged in an array.

In this optical system, when rays of light emitted from the plurality of light-emitting portions of the light-emitting device are incident on the optical lens, the first optical action portions of the plurality of columnar optical members in the optical lens act on the incident light in the X-axis direction. Consequently the divergence angle and the like of the emitted light can be adjusted. Hence even in cases when the light-receiving portion of the light-receiving device is extremely small, or when the array pitch of light-receiving portions is extremely small, each ray of light emitted from individual light-emitting portions can be reliably guided to the respective light-receiving portions. Also, because the plurality of columnar optical members of the first optical member array are constrained by the second optical member, when the optical lens is placed relative to a light-emitting device in which a plurality of light-emitting portions are placed in an array, it is possible to position the optical lens more simply than when columnar optical members are positioned independently for each light-emitting portion, so that simple installation of the optical system is possible. Also, when a plurality of columnar optical members are placed in an array, protruding or depressed portions are formed due to the first optical action portions of the plurality of columnar optical members, because curved surfaces are formed in the first optical action portions; in the above optical lens, these protruding or depressed portions are covered by the second optical member and are not exposed to the outside, so that dirt and the like does not accumulate on these portions. Hence excellent light emission performance can be maintained over extended periods of time, without exchanging, cleaning, or the like of the optical lens. Moreover, because the optical lens is excellent in strength, the frequency with which the optical lens is-replaced in an optical system is sufficiently reduced.

Also, an optical lens of this invention comprises:
  one or a plurality of first optical member arrays, having a plurality of columnar optical members arranged in an array along the X-axis direction, which have curved surfaces formed in each of the above plurality of columnar optical members, and which have a first optical action portion which acts in the above X-axis direction on light rays incident on the above columnar optical members; and, a second optical member, which constraines the above plurality of columnar optical members of the above first optical member arrays, which covers the above first optical action portions of the above plurality of columnar optical members, and which is formed from a transparent material; and wherein the refractive indices of the constituent material of the above columnar optical members and of the above transparent material of the above second optical member are different.

In this optical lens, the plurality of columnar optical members of the first optical member array are constrained in place by the second optical member. Consequently when the optical lens is positioned with respect to a light-emitting device in which are placed a plurality of light-emitting portions in an array, the operation of placing the optical lens can be performed extremely easily compared with the case in which columnar optical members are placed independently for each light-emitting portion. Further, when the optical lens is placed opposing the above light-emitting device, if the light rays emitted from each of the light-emitting portions of the light-emitting device are incident on columnar optical members of the optical lens, the first optical action portions of the columnar optical members act in the X-axis direction on the light incident on the columnar optical members. Also, when a plurality of columnar optical members are positioned, because the first optical action portion forms a curved surface, protrusions and depressions are formed by the first optical action portions of the plurality of columnar optical members, but these protrusions and depressions are covered by the second optical member and are not exposed outside, so that dirt and the like does not accumulate in these portions. Further, the first optical member array is constrained and reinforced by the second optical member, so that the strength of the optical lens is superior to that in cases where the first optical member array is not constrained by a second optical member.

An optical lens unit of this invention comprises the above optical lens, and a juxtaposed optical lens, which is placed juxtaposed with the above optical lens, and which comprises a third optical action portion which acts in the Y-axis direction on incident rays of light.

In this optical lens unit, the first optical action portions of columnar optical members in the above optical lens act in the X-axis direction, and the third optical action portion of the juxtaposed optical lens acts in the Y-axis direction. Hence by means of this optical lens unit, incident light rays can be acted on in both the X-axis and the Y-axis directions. Furthermore, the juxtaposed optical lens is provided separately from the columnar optical members, so that the distance between the first optical action portions and the third optical action portion can be adjusted as appropriate to the purpose.

An optical lens unit of this invention may have a first optical lens and second optical lens placed to be mutually parallel, in which the above first optical lens and the above second optical lens are each the above-described optical lens, which comprises the above-described first optical member array. In such an optical lens unit, because two optical lenses are placed in a parallel array, the distance between the respective optical action portions can be adjusted.

A stacked type optical lens of this invention is a stacked type optical lens which, after acting on each of the rays of light emitted from a light-emitting device in which a plurality of light-emitting portions are arranged in an array, emits the rays of light, and has the form of a stack of a plurality of levels of the above optical lenses.

According to such a stack type optical lens, the first optical member array acting on incident light from the light-emitting device is embedded in the second optical member in an integral structure, so that placement in a position enabling action on each incident light ray can be performed simply. Further, by placing columnar optical members in an array, the protruding and depressed portions due to the curved surfaces of the columnar optical members are covered by the second optical member and are not exposed to the outside, so that dirt and the like does not accumulate on these portions. Moreover, because the first optical member array is reinforced by the second optical member, the optical lens is excellent in strength. And, because the optical lens has a form in which a plurality of levels are stacked, the optical lens is adaptable to a light-emitting device in which light-emitting portions are stacked in a plurality of levels.

It is preferable that the second optical member in each level have a second optical action portion which forms a curved surface on the ray incidence face of the second optical member, and acts in the Y-axis direction on each incident light ray; and that the second optical member further comprise a condensing portion in which curved surfaces are formed in the entirety of the light emission face of the second optical member in each level, and which acts on each emitted light ray in both the Y-axis direction and in the X-axis direction, and condenses light in one place.

By this means, each of the emitted light rays from the light-emitting devices stacked in a plurality of levels can all be condensed in one place by the condensing portion.

Moreover, an optical system of this invention comprises a light-emitting device in which a plurality of light-emitting portions are arranged in an array; the above-described stack type optical lens, which acts on each of the rays of light emitted from the light-emitting device; and a light-receiving device, in which one or a plurality of light-receiving portions which receive rays of light emitted by the stack type optical lens are arranged in an array.

Thus, an optical system is provided comprising a stack type optical lens which can easily be positioned with respect to a light-emitting device in which, for example, a plurality of semiconductor laser arrays, each of which has light-emitting portions arranged in a row, are stacked in a plurality of levels, and which is excellent in light emission performance without accumulation of dirt or the like.

Also, a stacked type optical lens of this invention comprises:

one or a plurality of first optical member arrays, each having a plurality of columnar optical members arranged in an array along the X-axis direction, each of which has a curved surface, and has a first optical action portion which acts in the above X-axis direction on rays of light incident on the above columnar optical members; and, a second optical member, having a third and a fourth face formed on both sides of the first optical member arrays, in which at least one of the above third and fourth faces has a plurality of curved surfaces having second optical action portions which act on incident light rays in the Y-axis direction, and which is formed from a transparent material.

In such a stacked type optical lens also, the first optical member arrays which act on incident light rays from a light-emitting device are embedded in the second optical member in an integral structure, so that placement in a position enabling action on each of the incident light rays can be easily performed. And the protruding and depressed portions due to the curved surfaces of columnar optical members, formed through placement in an array of the columnar optical members, are covered by the second optical member and not exposed to the outside, so that there is no accumulation of dirt or the like on these portions. Also, because the first optical member arrays are reinforced by the second optical member, the stacked type optical lens is excellent in strength. And because the stacked type optical lens has a form in which the optical lens are stacked in a plurality of levels, it is adaptable to a light-emitting device in which semiconductor laser arrays, in which a plurality of light-emitting portions are arranged in a row, are stacked in a plurality of levels.

Also, an optical lens of this invention comprises:

a first optical member array, having a plurality of columnar optical members formed in a columnar shape from a transparent material, to include, in the external face on at least one side, a first optical action portion consisting of a curved surface parallel to a first axis, and in which the above plurality of columnar optical members are placed in an array shape such that the above plurality of first axes are mutually parallel in a prescribed plane; and, a second optical member, formed in a columnar shape from a transparent material having an index of refraction different from that of the above columnar optical members, to include, in the external face on at least one side, a second optical action portion consisting of a curved surface parallel to a second axis, and with at least the above first optical action portions of the above first optical member array embedded therein, such that the above second axis is perpendicular to the above plurality of first axes; and in which the first and second optical action portions act on light on optical axes which intersect orthogonally in a prescribed plane.

According to the optical lens of this invention, the first optical member array, which acts on incident light rays from a light-emitting device, is embedded in the second optical member in an integral structure, so that placement in a position enabling action on each of the incident light rays can be easily performed. Also, because the protruding and depressed portions due to the curved surfaces of each of the columnar optical members, formed by arrangement in an array of columnar optical members, are covered by the second optical member and not exposed to the outside, there is no accumulation of dirt or the like on these portions. And, because the first optical member array is reinforced by the second optical member, the optical lens is excellent in strength.

An optical lens with simple structure can easily be manufactured using known methods in minute sizes. Consequently manufacturing can be performed with the size of the second optical member, and the sizes and number of the columnar optical members in the first optical member array, easily adjusted according to the conditions of placement of a plurality of light sources arranged in an array, or the conditions of placement of a plurality of illumination spots arranged in an array. Hence it is possible to make the first optical action portions of a plurality of columnar optical members in the first optical member array correspond to each minute light source; and, the optical lens can easily be placed in a minute range before the onset of overlapping of light rays emitted from adjacent minute light sources, so that incident light rays from light sources can be acted on independently for each light source. Further, even when the plurality of minute light sources have astigmatism and are arranged in an array, because in an optical lens of this invention the second optical action portion of the second optical member and the plurality of first optical action portions in the first optical member array are arranged as described above, so that the vertical components and parallel components of beams emitted from the light sources, with different divergent angles, can be acted on together.

Also, the first optical action portions of the plurality of columnar optical members constituting the first optical member array can correspond to a plurality of illumination spots arranged in an array one-to-one, and the plurality of emitted light rays which have been subjected to action can be illuminated together, a plurality of prescribed corresponding illumination spots.

Here the "first axis" is the axis (central axis) passing through the geometrical centers of the two base faces of the columnar optical members, and refers to the axial line which is parallel with the extending direction of the columnar optical members. The "second axis" is the axis (central axis) passing through the geometrical centers of the two base faces of the columnar second optical member, and refers to the direction of arrangement of the columnar optical member (the axial line parallel with the extending direction of the second optical member).

It is preferable that the transparent material of the above columnar optical members have a thermal expansion coefficient higher than that of the transparent material of the second optical member. If the optical lens is manufactured with a material having a high thermal expansion coefficient covered by a material with a low coefficient, a crimping effect results in a durable structure which resists cracking.

It is preferable that the transparent material of the above columnar optical members have a yield point higher than that of the transparent material of the above second optical member. The difference in yield points can be utilized to manufacture an embedded type optical lens using a drawing process.

The above columnar optical members may, for example, be formed into cylindrical shapes.

The above columnar optical members may be formed into semi-cylindrical shapes, with the outer face of the side opposite the above curved surface be formed into a planar surface.

It is preferable that the above columnar optical members be formed with a pair of planar side faces between the above curved surface, and the outer face opposite the above curved surface, and that the above first optical member array be formed by arranging in an array the above columnar optical members, so as to be in mutual contact at the above planar side faces. Because planar side faces are formed, the plurality of columnar optical members can be easily arranged in an array, and the optical lens can be manufactured efficiently. As a result, the optical lens becomes inexpensive.

The above second optical member may be formed into, for example, a cylindrical shape.

The above second optical member may be formed into, for example, a semispherical shape, with the outer face opposing the curved surface formed into a planar face.

The above optical lens may further have a pair of rolling prevention means, provided on both ends of the second optical member, which prevents rolling of the above second optical member. Through these rolling prevention means, rolling of the second optical member is prevented, so that when mounting the second optical member on a semiconductor laser array in which a plurality of light-emitting portions are placed in an array, the mounting operation is extremely easy. Also, the angle of mounting of the optical lens on the semiconductor laser array is determined.

It is preferable that the above pair of rolling prevention means have contact faces consisting of planar faces respectively.

In this case, because the contact face is a plane, when the rolling prevention means of adjacent optical lenses are brought into mutual contact at the contact faces, it is possible to easily stack a plurality of optical lenses, so that, for example, the operation of mounting on a light-emitting device in which semiconductor laser arrays are stacked in a plurality of levels becomes easy.

A semiconductor laser apparatus of this invention has a semiconductor laser array, in which a plurality of light-emitting portions are arranged in an array; ray parallelizing means, which parallelizes and emits light rays emitted from the above plurality of light-emitting portions; and a condensing optical system, which condenses and outputs the rays emitted by the above ray parallelizing means; the above ray parallelizing means is the above optical lens, and the direction of the array of the above plurality of light-emitting portions in the above semiconductor laser array is parallel to the direction of the array of the above plurality of columnar optical members in the above optical lens.

In this semiconductor laser apparatus, the number of columnar optical members in the first optical member array is matched with the number of light-emitting portions of the semiconductor laser array used; in addition, when the pitch of the plurality of columnar optical members is made equal to the pitch of the array of light-emitting portions used, the second optical member acts in the Y-axis direction on the laser beams emitted from the respective plurality. of light-emitting portions, and the columnar optical members act in the X-axis direction on the laser beams emitted from the respective plurality of light-emitting portions.

It is preferable that the two end faces of the above columnar optical members be exposed from the second optical member. If the two end faces are thus exposed from the second optical member, when the optical lens is being placed with respect to a semiconductor laser array, positioning of the first optical action portions with respect to the light-emitting portions becomes easy, and the region up to the interface of the second optical member can be regarded as the first optical action portions.

BRIEF DESCRIPTION OF THE DRAWINGS

FIG. 7A to FIG. 7I are perspective views showing a second embodiment of an optical lens of this invention;

FIG. 10A to FIG. 10F are perspective views showing a second embodiment of an optical lens unit of this invention;

DESCRIPTION OF THE PREFERRED EMBODIMENTS

Figure 1C:
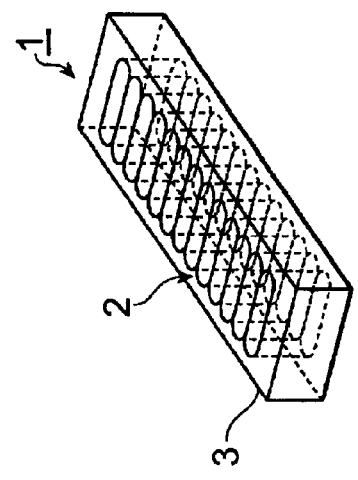
FIG. 1A to FIG. 1D are perspective views showing a first embodiment of an optical lens of this invention.

Below, an embodiment of this invention is explained in detail, referring to the drawings. In the following explanation, the same symbols are assigned to the same or equivalent portions, and redundant explanations are omitted.

FIG. 1A to FIG. 1D are perspective views showing a first embodiment of an optical lens of this invention. FIG. 2 is a partial enlarged view of the optical lens shown in FIG. 1A. The optical lens 1 shown in FIG. 1A collimates each of the incident diverging light rays that are emitted from a semiconductor laser array, serving as a light-emitting device in which a plurality of light-emitting portions are arranged in an array, and then emits the light rays to optical fibers or other light-receiving portions. Unless noted otherwise, in the following explanation, the light incidence direction 6 and light emission direction 7 of the optical lens are the same as the direction shown in FIG. 1A.

The optical lens 1 of this first embodiment comprises a first optical member array 2, corresponding to the semiconductor laser array, and a second optical member 3, in which is embedded the first optical member array 2. The first optical member array 2 comprises a plurality of columnar optical members 10, each comprising a first optical action portion 11 which collimates a ray of light incident from the semiconductor laser array; in the first optical member array 2 columnar optical members 10 are formed in a row, with the column axes aligned in the same direction.

The plurality of columnar optical members 10 of the first optical member array 2 are constrained by the second optical member 3, and the first optical action portions 11 of the plurality of columnar optical members 10 are covered by the second optical member 3. Each of the plurality of columnar optical members 10 has two end faces 10a, 10b; both of these two end faces 10a, 10b are exposed outside the second optical member 3. Because the two end faces 10a, 10b are thus exposed outside the second optical member 3, when positioning the optical lens 1 with respect to a semiconductor laser array, it is easy to position the first optical action portions 11 with respect to the light-emitting portions, and in addition the region up to the interfaces (the upper surface and the lower surface) of the second optical member 3 can be regarded as the first optical action portions 11.

In this embodiment, the column axis direction (Y-axis direction) of the columnar optical members 10 and the direction in which the columnar optical members 10 are arranged (X-axis direction) are perpendicular; but the two axes need not be perpendicular. The first optical action portions 11 comprise a convex curved surface formed against the direction of incident light 6. That is, the second optical member 3 has a third face 3a and a fourth face 3b, provided on both sides of the first optical member array 2; the third face 3a is formed on the light incidence side, and the fourth face 3b is formed on the light exit side. The first optical action portions 11 of the columnar optical members 10 are faced toward the side of fourth face 3b, which is the light exit side (see FIG. 2). The second optical member 3 is formed into a column shape from transparent glass material (BK7 (manufactured by Schott), refractive index 1.52, thermal expansion coefficient $71 \times 10^{-7}$/K, yield point 614° C.), with the first optical member array 2 embedded within, in the column axis direction. A plurality of first optical member arrays 2 may be provided. The column axis direction of the second optical member 3 is parallel to the X-axis direction in FIG. 1A; the column axis direction of the columnar optical members 10 is parallel to the Y-axis direction.

The optical lens 1 of the first embodiment has a shape in which a plurality of columnar optical members 10, each existing separately, is covered by second optical member 3; hence there is no need to place each of the columnar optical members 10 in an array corresponding to each of the light-emitting portions, and in this respect the optical lens has functions equivalent to those of an integrally formed optical lens. On the other hand, because the first optical member array 2 is embedded in the second optical member 3, the protruding and depressed portions of the first optical action portions 11 are not exposed to the outside. Consequently, there is no accumulation of dirt or the like in the protruding or depressed portions, and an optical lens 1 with excellent light emission performance and without forming shadows is realized. Also, due to reinforcement by the second optical member 3, the optical lens is excellent in strength.

As the constituent material of the columnar optical members 10 of the first optical member array 2, glass material (LaSFn14 (Sumita Optical Glass), refractive index 1.83, thermal expansion coefficient $82 \times 10^{-7}$/K, yield point 689° C.) having a higher refractive index than the transparent material of the second optical member 3 (for example, BK7 (manufactured by Schott), refractive index 1.52, thermal expansion coefficient $71 \times 10^{-7}$/K, yield point 614° C.) is used. Because a refractive index difference is provided, the first optical action portions 11 of the columnar optical members 10 function effectively; and because the constituent material of the columnar optical members 10 has a higher refractive index than the transparent material of the second optical member 3, each of the divergent light rays emitted from the semiconductor laser array is collimated by the convex-shape curved surface of a first optical action portion 11 (in cases where a material with lower refractive index than the transparent material of the second optical member 3 is used as the constituent material of the columnar optical members 10, each of the divergent light rays emitted from the semiconductor laser array is collimated by a concave-shape curved surface formed in the first optical action portion 11). Further, as the constituent material of the columnar optical member 10, material with a higher thermal expansion coefficient than the transparent material of the second optical member 3 is used. When material with a high thermal expansion coefficient is covered by material with a low thermal expansion coefficient, the crimping effect ensuing in the heated stretching process and cooling process results in a structure that is durable and resistant to cracking.

Figure 1B:
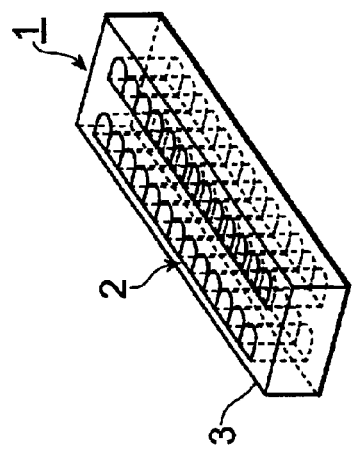
Figure 1D:
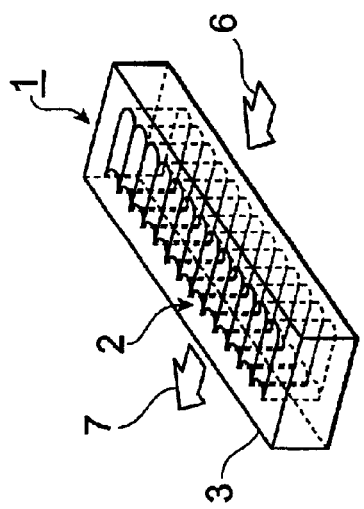
Figure 2:
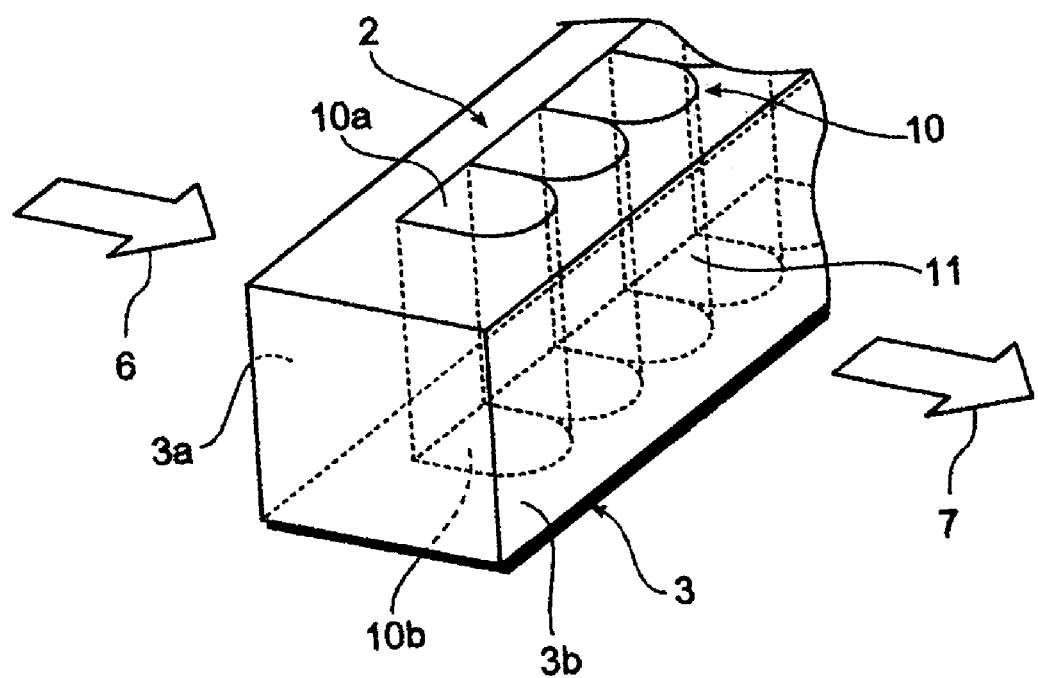
FIG. 2 is a partial enlarged view of the optical lens shown in FIG. 1A.

As shown in FIG. 1B, a plurality of first optical member arrays 2 may be present in the optical lens 1, and these may be embedded in parallel within the second optical member 3. Also, as shown in FIG. 1C, the first optical action portions 11 may be convex curved surfaces formed on both the light incidence side and the light emission side of the columnar optical members 10. Further, as shown in FIG. 1D, a concave curved surface may be formed on the light incidence side of each columnar optical member 10, and a convex curved surface formed on the light emission side. In this case, as shown in FIG. 13B, often the lens is used together with an optical lens such as that shown in FIG. 7B. In all of the optical lenses 1 shown in FIG. 1B to FIG. 1D, the collimator in the X-axis direction is divided into two stages. By this means, two types of optical emission, of the telescope type and Fourier type, are possible. This is discussed in detail below. The optical lens 1 of this embodiment is of the embedded type, and so the positions of the two curved surfaces having functions for collimation in the X-axis direction are designed in advance; hence positioning with respect to a semiconductor laser array can be performed simply.

Figure 3:
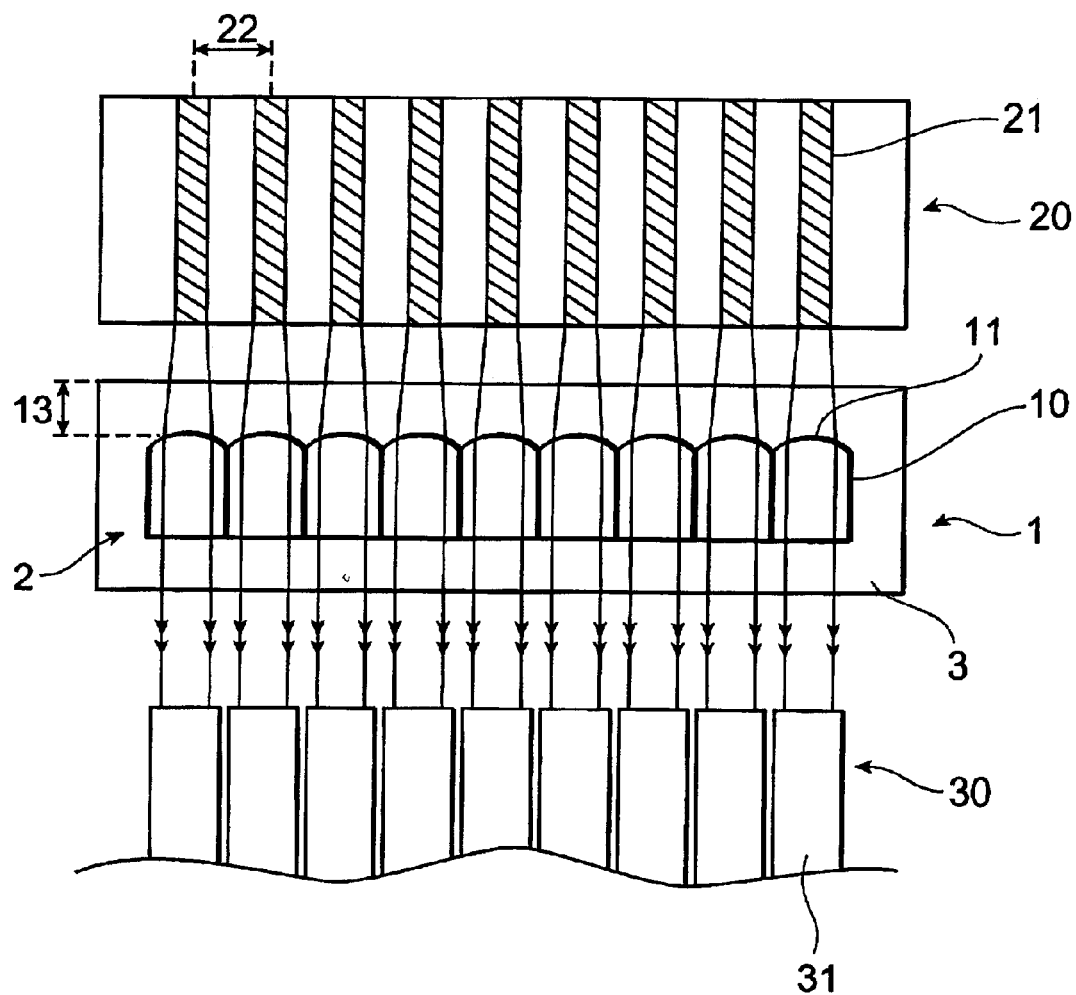
FIG. 3 is a plane view of an optical system comprising a semiconductor laser array, optical lens, and optical fibers.

FIG. 3 is a plane view of an optical system comprising a semiconductor laser array, optical lens, and optical fibers. Each of the divergent light rays emitted from the semiconductor laser array (light-emitting device) 20 in which a plurality of light emitting portion 21 are arranged in an array is incident on a respective columnar optical member 10 of the first optical member array 2, and is collimated by (or, may be condensed by) the first optical action portion 11 of each of the columnar optical members 10. The pitch of the columnar optical members 10 constituting the first optical member array 2 is designed to be the same as the pitch 22 of the plurality of light-emitting portions 21 constituting the semiconductor laser array 20. By this means, simply by adjusting the position of the first optical member array 2 with respect to the semiconductor laser array 20, the position with respect to all the light-emitting portions 21 constituting the laser array can be adjusted. Further, by designing the thickness 13 of the second optical member 3 to be sufficiently small, it is easy to place the optical lens 1 in a position prior to the beginning of overlap of light rays emitted from each of the light-emitting portions 21 of the semiconductor laser array 20. Each of the light rays collimated and emitted by the first optical member array 2 is received by an optical fiber 31 of an optical fiber array 30.

Figure 4A:
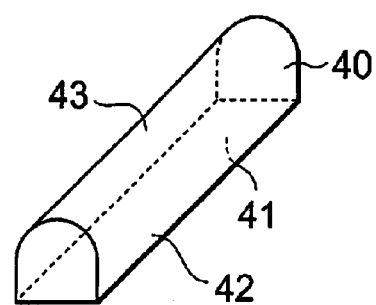
FIG. 4A to FIG. 4C is a schematic view showing each process in a method of manufacture of an optical lens by drawing.
Figure 4B:
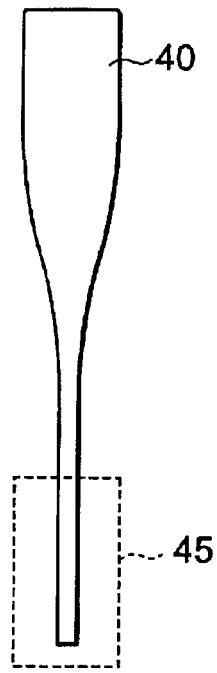
Figure 4C:
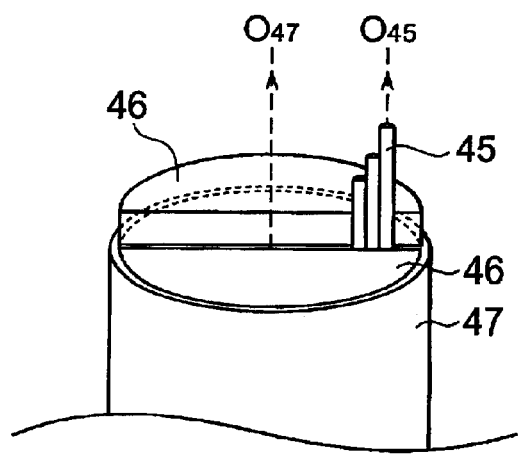
Figure 5A:
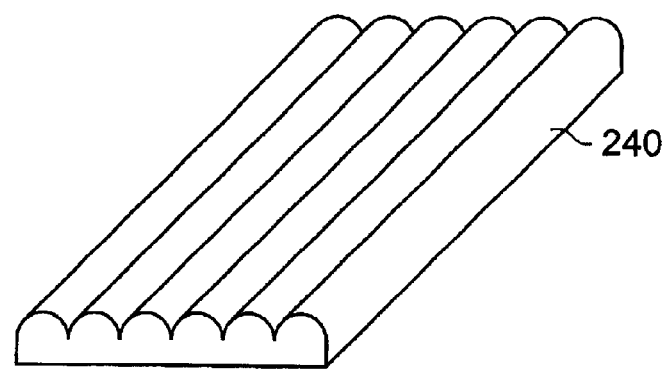
FIG. 5A to FIG. 5C is a schematic view showing each process in another method of manufacture of an optical lens by drawing.
Figure 5B:
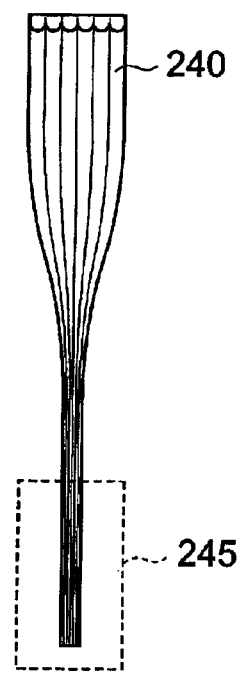
Figure 5C:
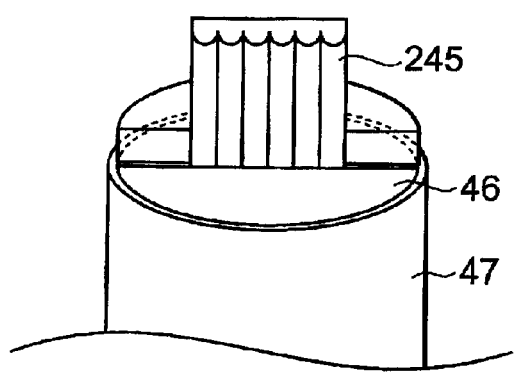

FIGS. 4 to 6 are schematic views showing each process of methods to manufacture an optical lens by drawing. First, as shown in FIG. 4A, a parent material (hereafter called the "core 40") comprising the constituent material of the first optical member array 2 is molded into a columnar shape having a bottom face 41. The upper convex curved surface 43 in FIG. 4A is the portion that will become the first optical action portion 11 of the columnar optical member 10 finally formed. In this way, a feature of a method for manufacturing an optical lens using the drawing method is that the shape can be determined at the stage of the core 40. Next, as shown in FIG. 4B, the molded core 40 is heated and fused in an electric furnace or the like, and a first drawing is performed to obtain the desired size. Then, the portion which has been subjected to the first drawing and is of the desired size (hereafter the "core 45") is cut. The core 45, after this first drawing, has the same cross-sectional shape as the core 40. Next, as shown in FIG. 4C, core 45 are arranged in a row in the center portion of a cylindrical tube 47 formed from the constituent material of the second optical member 3, in a number equal to the number of columnar optical members to be arranged in an array. At this time, the central axis $O_{47}$ of the cylindrical tube 47 and the central axis $O_{45}$ of the plurality of core 45 are parallel, and the plurality of core 45 are arranged such that the side faces 42 are in mutual contact. In order to fix the positions of the plurality of core 45 thus arranged, a pair of spacers 46, formed from the constituent material of the second optical member 3, are inserted into the gaps within the cylindrical tube 47 so as to enclose on both sides the arranged core 45. As shown in FIGS. 5A to 5C, parent material may be molded into a shape such as the core 240, and this may be drawn to fabricate the core 245. In the core 240, a plurality of portions corresponding to the first optical action portion 11 are already placed in a row, and these are formed integrally. Hence in the processing of FIG. 5C, the process of arranging a plurality of core in a row within the cylindrical tube 47 can be omitted. In the above method of manufacture of an optical lens, the cylindrical tube 47 shown in FIG. 4C and in FIG. 5C need not be formed from the constituent material of the second optical member 3, and a glass tube or the like may be used. Also, there are no limitations in particular on the constituent materials or refractive indices of the second optical member 3 or the columnar optical members 10, and plastics or a nonlinear optical crystal such as $LiNbO_3$ may be used.

Figure 6A:
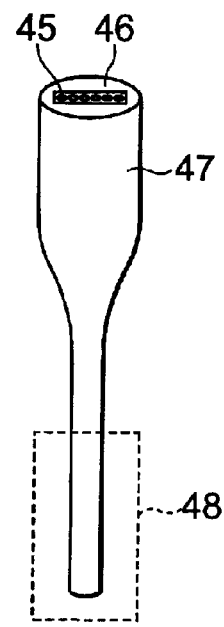
FIG. 6A to FIG. 6C is a schematic view showing each process in another method of manufacture of an optical lens by drawing.
Figure 6B:
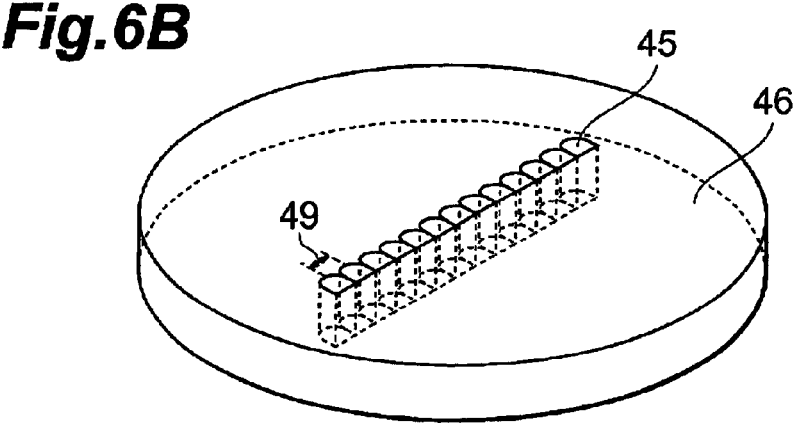
Figure 6C:
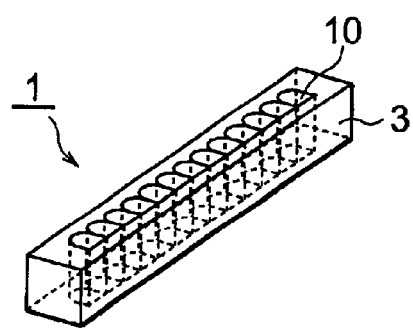

Next, as shown in FIG. 6A, a second drawing is performed so that the cylindrical tube 47 assumes the final desired outer diameter. This second drawing is performed at a temperature between the yield point of the constituent material of the columnar optical members 10, and the yield point of the transparent material of the second optical member 3 (the former is higher than the latter). By this means, the shape of the columnar optical members 10 formed in the first drawing process is retained in the second drawing process, and moreover the constituent material of the second optical member 3 (the portion of the spacers 46) is melted, and the gap between the columnar optical members 10 and the second optical member 3 is filled. At this time, the pitch 15 of the plurality of core 45 is adjusted to match the pitch of the plurality of light sources arranged in an array. For example, when a semiconductor laser array 20 is used as a light source as shown in FIG. 3, the pitch is made to match the pitch 22 of the light-emitting portions 21. Then, the rod portion 48 resulting from second-drawing processing of the cylindrical tube 47 as shown in FIG. 6A is sliced as shown in FIG. 6B, and the excess portions of the spacers 46 are sliced away as shown in FIG. 6C. After slicing, the outer perimeter portion of the spacers 46 is ground, to form an optical lens 1 of the desired size. Through this grinding of the spacer portion 46 in this final process, the second optical action portion can be formed. In this way, the optical lenses 1, 70 are formed from different optical members, so that the refractive indices of these optical members (including, in addition to the refractive indices of the optical members themselves, the refractive indices due to the optical action portions formed by forming curved-surface shapes) can be set appropriately and manufactured, and in particular the difference in refractive indices can be set to be large, and manufactured. As disclosed in Japanese Patent Laid-open No. H7-287104 or in Japanese Patent Laid-open No. H7-98402, it is also possible to utilize ion exchange at the outer faces of the same optical lens to form lenses having different refractive index differences; but in this case, there are the problems that it is not possible to provide a sufficient refractive index difference between portions subjected to ion exchange and portions not thus subjected, and that a sufficient refractive index difference also cannot be provided while accurately forming the curved-surface shape of the optical action portion. Because the optical lens of this embodiment comprises different optical members 1, such problems are eliminated.

FIGS. 7A to 7I are perspective views showing a second embodiment of an optical lens of this invention. In the optical lens 70 of this second embodiment, the second optical member 73 comprises second optical action portions 75, 76, 78 which form a convex curved surface and collimate incident light rays. A feature of the second embodiment is that the second optical member 73 is not present merely to embed the first optical member array 2. Otherwise the configuration is similar to that of the optical lens 1 of the first embodiment.

Figure 8A:
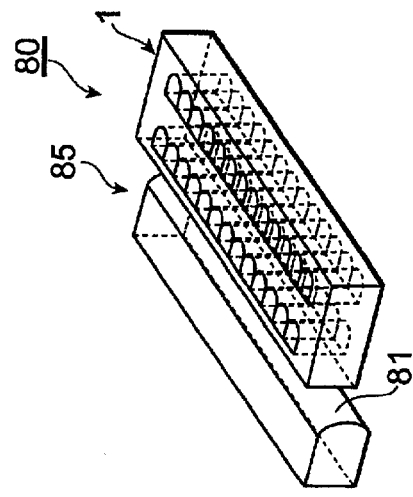
FIG. 8A to FIG. 8F are perspective views showing a first embodiment of an optical lens unit of this invention.
Figure 8B:
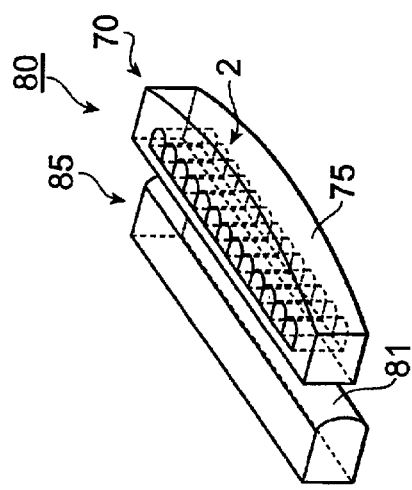
Figure 8C:
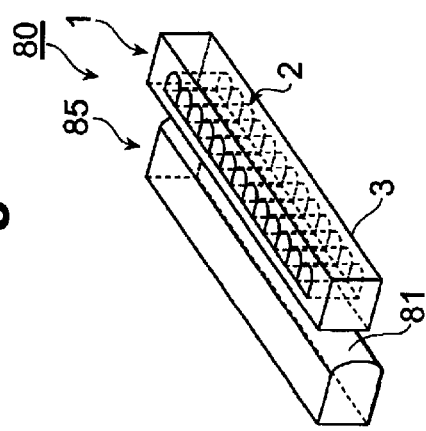
Figure 8D:
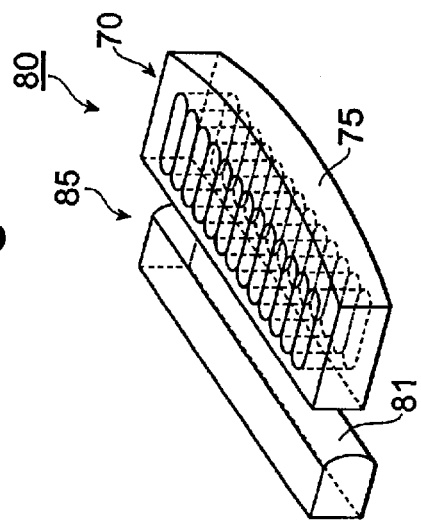
Figure 8E:
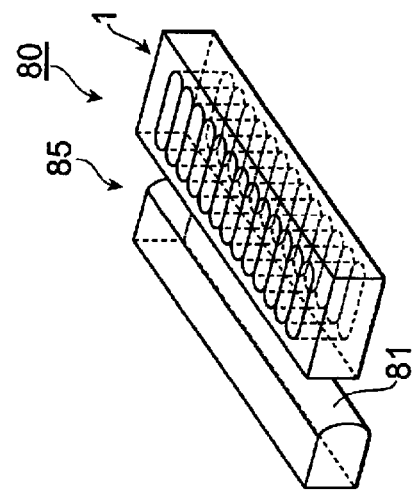
Figure 8F:
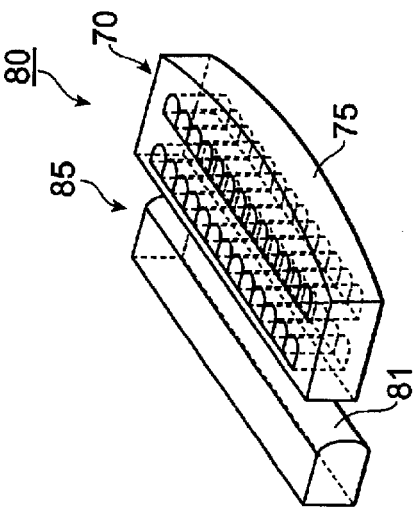
Figure 9:
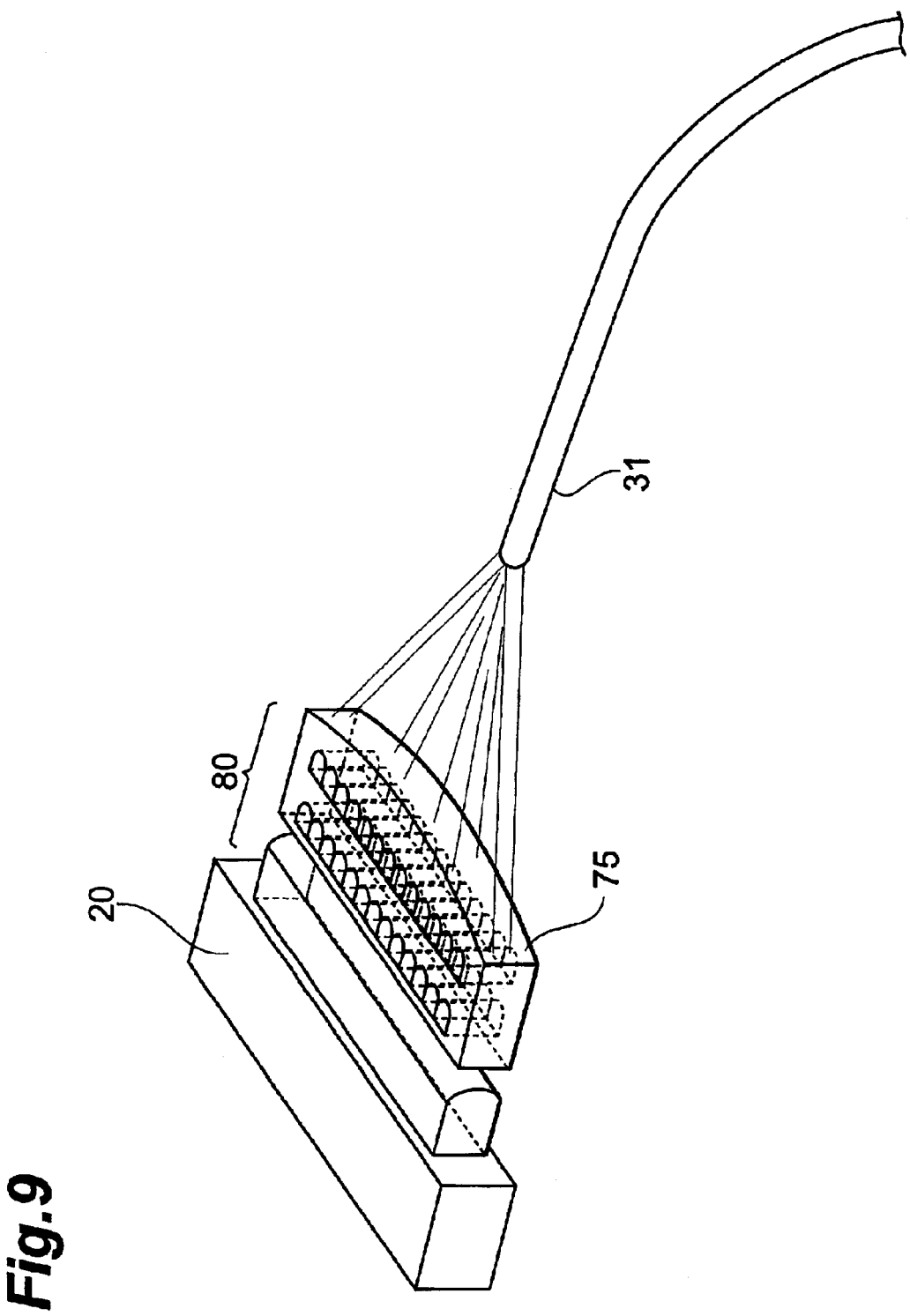
FIG. 9 is a schematic view showing the action of a second optical action portion, which collimates incident light in the X-axis direction.

In the optical lens 70 shown in FIGS. 7A, 7D and 7E, the second optical action portion 75 condenses the X-axis direction component among the components of the light rays incident on the optical lens 70. By this means, each of the light rays emitted from the first optical member array 2 of the optical lens 70 can be condensed, so that, for example, the light density can be raised. FIG. 9 shows the action of the second optical action portion 75 in condensing incident light rays in the X-axis direction (however, in FIG. 9 the optical lens unit 80 shown in FIG. 8D is used, and as an example of the optical lens included in the optical lens unit 80, the optical lens 70 shown in FIG. 7D is used). In the optical lens 70 shown in FIGS. 7B, 7F and 7G, the second optical action portion 76 collimates the Y-axis direction component among the light rays incident on the optical lens 70. The second optical action portion 76 may also be formed on the emission side (the fourth face 73b of the second optical member 73), to collimate the Y-axis direction component of the emitted light. In the optical lens 70 shown in FIGS. 7C, 7H and 7I, the second optical action portion 78 collimates the Y-axis direction component among the light rays incident on and emitted from the optical lens 70. The second optical action portions 76, 78 shown in FIGS. 7B, 7F, 7G, 7C, 7H, 7I may be bonded to the second optical member 73, or may be formed by grinding the second optical member 73. In the optical lenses shown in FIGS. 7B, 7F, 7G, 7C, 7H, 7I, light which has been collimated in the X-axis and Y-axis directions, in keeping with collimation in the X-axis direction by the first optical member array 2, is emitted.

FIGS. 8A to 8F and 10A to 10F are perspective views of first and second embodiments, respectively, of an optical lens unit of this invention. In the optical lens unit 80 of these embodiments, a juxtaposed optical lens 85 is juxtaposed with the optical lens 1 or 70. The optical lens unit 80 shown in FIGS. 8A, 8C and 8E comprises the optical lens 1 shown as the first embodiment in FIGS. 1A, 1B and 1C, and a juxtaposed optical lens 85 juxtaposed with the optical lens 1 as the first embodiment, comprising a third optical action portion 81, which collimates light rays in the Y-axis direction. Similarly, the optical lens units 80 shown in FIG. 8B, 8D and 8F comprise the optical lens 70 shown as the second embodiment in FIGS. 7A, 7D and 7E, and a juxtaposed optical lens 85 juxtaposed with the optical lens 70 as the second embodiment, comprising a third optical action portion 81, which collimates light rays in the Y-axis direction. The third optical action portion 81 is formed as a convex curved surface opposing the first optical member array 2. By separately providing a juxtaposed optical lens 85, the juxtaposed lens. can be placed at a desired position, and the position of the beginning of collimation of light rays from the light-emitting portions 21 in the Y-axis direction can be adjusted.

In the optical lens units 80 of FIGS. 10A to 10F, the juxtaposed optical lens 84 of FIGS. 8A to 8F is replaced with a juxtaposed optical lens 89. The juxtaposed optical lens 89 comprises a third optical member 87, comprising a third optical action portion 81, and a fourth optical member 88, formed from transparent material, and in which the third optical member 87 is embedded. Here, the juxtaposed optical lens 89 differs from the juxtaposed optical lens 85 in comprising a third optical member 87 within the fourth optical member 88. By making the shape of the fourth optical member 88 a square column, mounting onto an optical lens having a first optical member array 87 is possible; and because the third optical member 87 is covered by the fourth optical member 88, there is the further advantage that the third optical action portion 81 is not scratched or otherwise damaged.

Figure 11A:
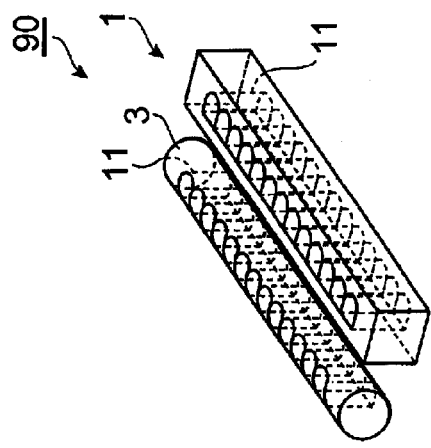
FIG. 11A to FIG. 11E are perspective views showing a third embodiment of an optical lens unit of this invention.
Figure 11B:
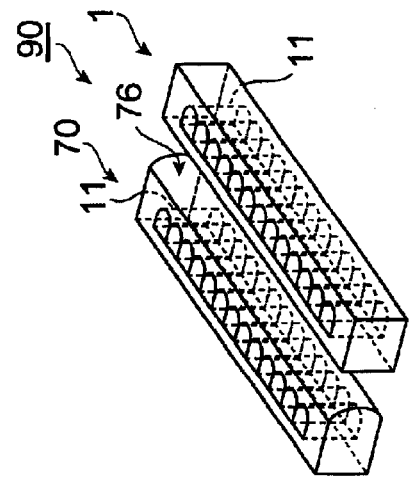
Figure 11C:
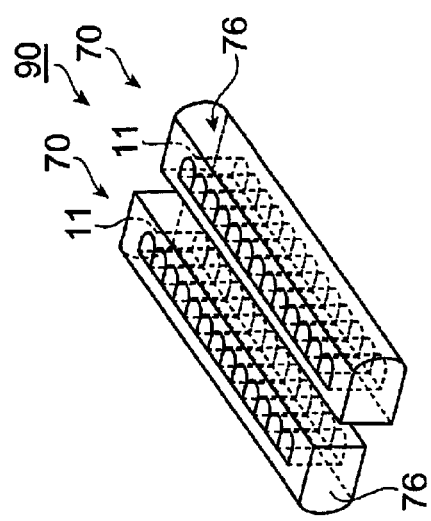
Figure 11D:
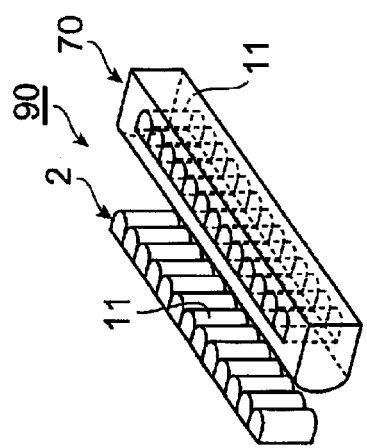
Figure 11E:
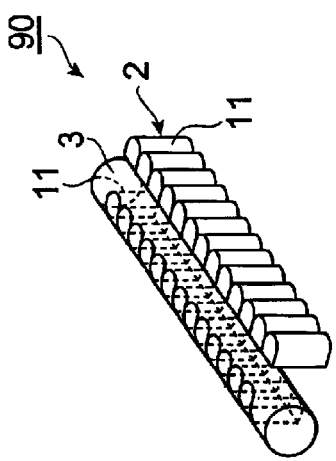

FIGS. 11A to 11E are perspective views showing a third embodiment of an optical lens unit of this invention. The optical lens unit 90 of this embodiment is an optical lens unit in which optical lenses, in which-one first optical member array 2 is embedded, are arranged in two parallel rows. In the optical lens unit 90 shown in FIG. 11A, an optical lens 70 of the type shown in FIG. 7B (first optical lens) and an optical lens 70 (second optical lens) are arranged in two parallel rows. However, a lens in which the second optical action portions 76 are formed on the light incidence side, and a lens in which the second optical action portions 76 are formed on the light emission side, are used as a pair. In the optical lens unit 90 shown in FIG. 11B, an optical lens 70 shown in FIG. 7B (first optical lens) and an optical lens 1 shown in FIG. 1A (second optical lens) are arranged in two parallel rows. In the optical lens unit 90 shown in FIG. 11C, of the optical lenses arranged in two rows, one is an optical lens in which the second optical member 3 is formed into a cylindrical shape. By dividing such an optical lens into two rows, the distance between the optical action portions of the two optical lenses (in this case, the distance between the first optical action portions 11 in particular) can be freely adjusted. As an exception, it is also possible to use lenses in which there is no second optical member 3, and the first optical member array 2 is exposed, as shown in FIGS. 11D and 11E.

Figure 1A:
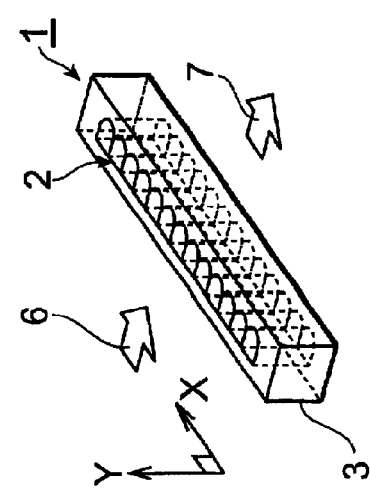
Figure 12A:
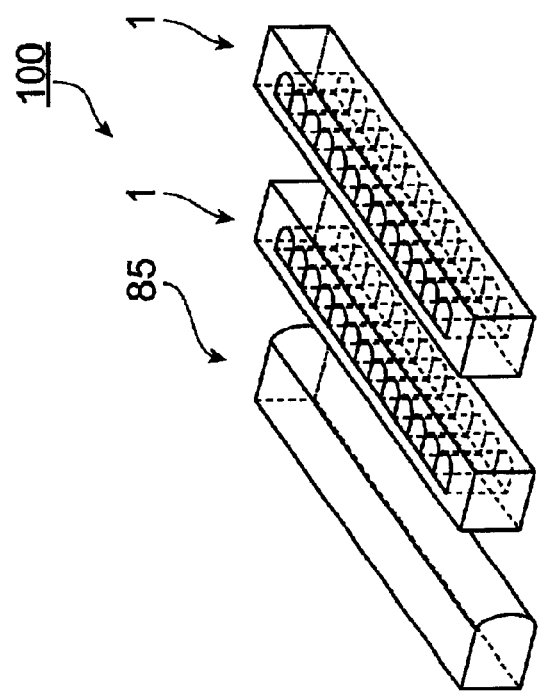
FIG. 12A and FIG. 12B are perspective views showing a fourth embodiment of an optical lens unit of this invention.
Figure 12B:
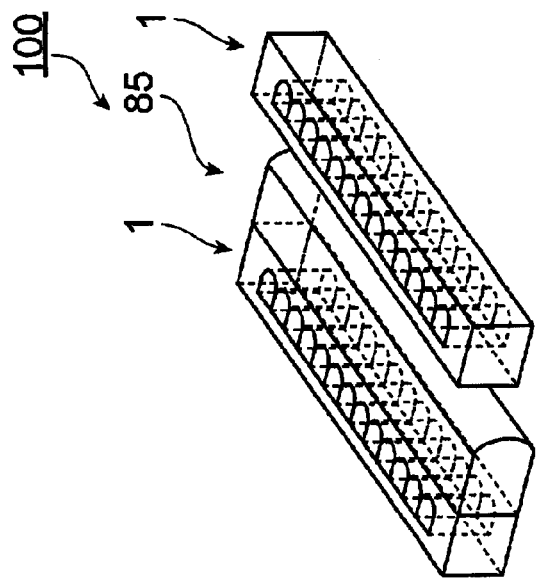

FIGS. 12A and 12B are perspective views of a fourth embodiment of an optical lens unit of this invention. In FIGS. 12A and 12B, optical lens units 100 are shown in which two rows of optical lenses 1 such as shown in FIG. 1A are arranged in parallel, with a juxtaposed optical lens 85 such as shown in FIG. 8 juxtaposed. In FIG. 12A, the juxtaposed optical lens 85 is placed in the closest position to the semiconductor laser array 20. In FIG. 12B, the juxtaposed optical lens 85 is placed between the two optical lenses 1. Similarly to the fourth embodiment, by dividing the optical members, the distance between the optical action portions of the respective optical lenses can be freely adjusted. Also, it is possible to adjust the position at which collimation in the Y-axis direction of light rays from the light-emitting portions 21 is begun.

Figure 13A:
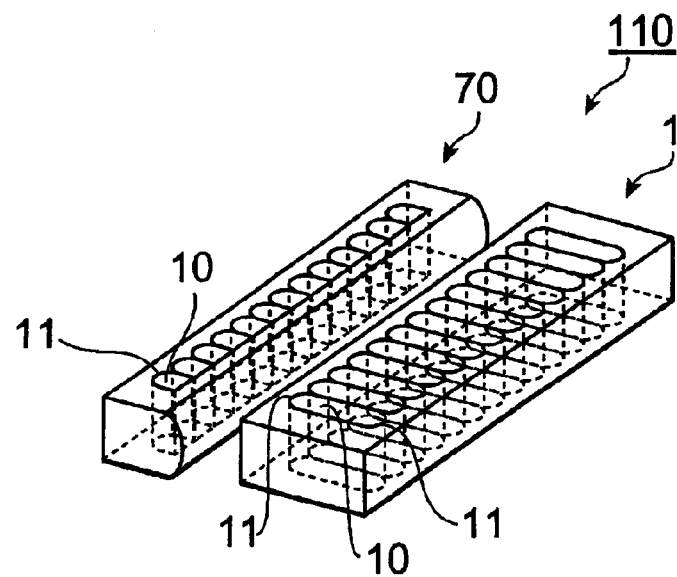
FIG. 13A and FIG. 13B are perspective views showing a fifth embodiment of an optical lens unit of this invention.
Figure 13B:
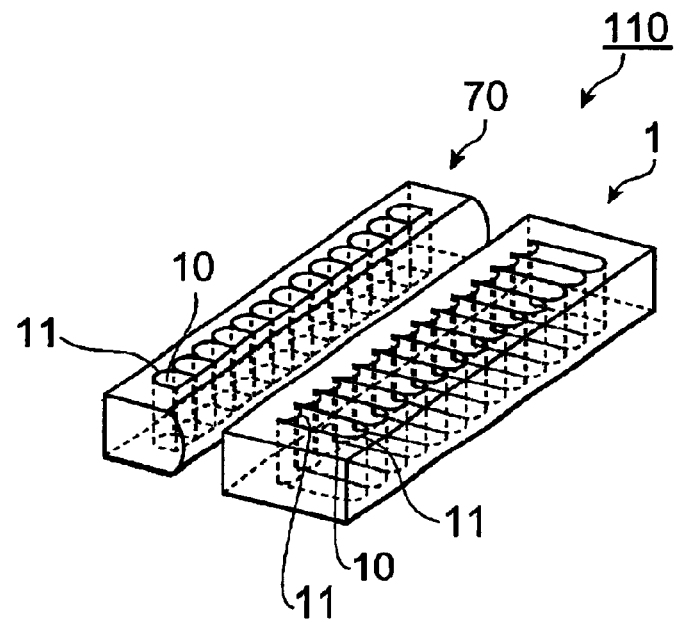
Figure 14A:
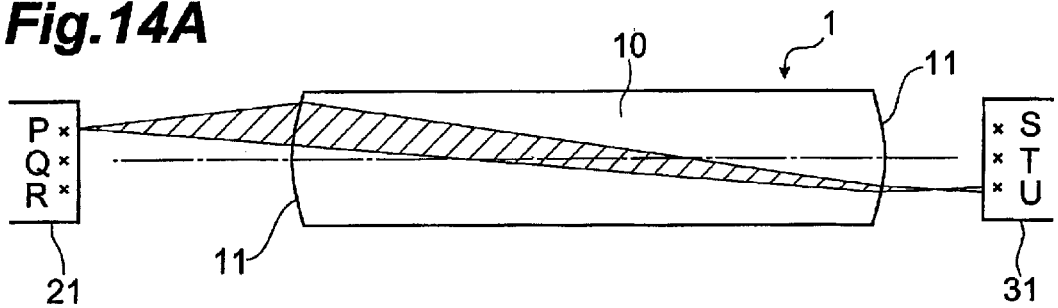
FIG. 14A to FIG. 14D are plane views of an optical system comprising a light-emitting portion, optical lens or optical lens unit, and optical fiber.

FIGS. 13A and 13B are perspective views showing a fifth embodiment of an optical lens unit of this invention; FIG. 14A is a plane view showing an optical system comprising a light-emitting portion 21, optical lens 1, and optical fiber 31, indicating how light rays emitted from the light-emitting portion 21 are acted upon. In the optical lens 110 shown in FIG. 13A, the optical lens 70 shown in FIG. 7B and the optical lens 1 shown in FIG. 1C are arranged in parallel. The optical lens 70 is placed on the light incidence side, and the optical lens 1 on the light emission side. This optical lens 1 is a telescope type optical lens, acting on incident light as shown in FIG. 14A. In other words, a divergent light ray emitted from point P of the light-emitting portion 21 is condensed by the first optical action portion 11 on the incidence side, advances unchanged within the columnar optical member 10, is again condensed by the first optical action portion 11 on the emission side, and is received at point U of the optical fiber 31. The divergent ray emitted from point R of the light-emitting portion 21 is similarly received at point S of the optical fiber 31. The divergent ray emitted from point Q of the light-emitting portion 21 is received at point T of the optical fiber 31. In this way, in a telescope type optical lens, a light ray incident from a given point is emitted to reach a position which is symmetrical with respect to the center line.

Figure 14B:
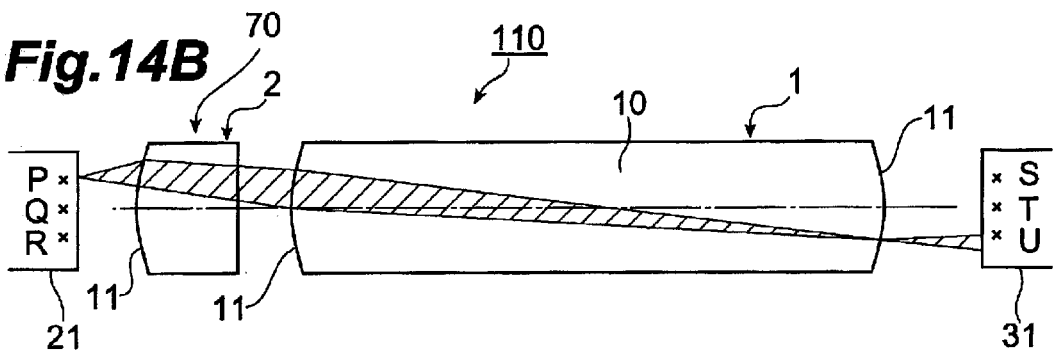

FIG. 14B is a plane view of an optical system comprising a light-emitting portion 21, the optical lens unit shown in FIG. 13A, and an optical fiber 31, and shows how light emitted from the light-emitting portion 21 is acted upon. Because an optical lens 70 is placed between the light-emitting portion 21 and the optical lens 1, the divergence angle of the light ray from the light-emitting portion 21 is reduced before the ray diverges greatly, and through the first optical action portion 11 it is possible to cause the position at which the ray is focused to be on the first optical action portion 11 on the emission side. As a result, the effect of aberration is eliminated, and the quality of the emitted light is improved. It is also possible to employ a configuration using a spherical surfaces to improve quality, but in this case manufacturing is difficult. In the optical lens unit of this embodiment, simply by placing the optical lens 70, in which each of the columnar optical members 10 is already formed integrally, in the appropriate position, the quality of the light emitted from a telescope type optical lens can be improved.

Figure 14C:
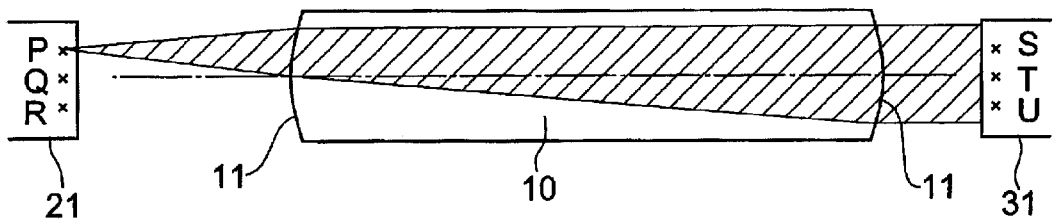

In the optical lens unit 110 shown in FIG. 13B, the optical lens 70 shown in FIG. 7B and the optical lens 1 shown in FIG. 1D are arranged in parallel. The optical lens 70 is placed on the light incidence side, and the optical lens 1 on the light emission side. The optical lens 1 is a Fourier type optical lens; the incident light is acted on as shown in FIG. 14C (whereas in FIG. 13B, the first optical action portion on the incidence side of the optical lens 1 is a concave curved surface, in FIG. 14C a convex curved surface is used; because a feature of Fourier type optical lenses is that, as explained later, there is overall broadening on the emission side with respect to one point on the incidence side, whether the curved surface is concave or convex is not an issue). That is, divergent light rays emitted from point P of the light-emitting portion 21 are condensed by the first optical action portion 11 on the incidence side (including action to condense the divergence angle), and the light ray advances unchanged within the columnar optical member 10, is again condensed by the first optical action portion 11 on the emission side, and is received by the optical fiber 31. Compared with a telescope type lens, the curvature of the curved surface of the first optical action portion is small, and the divergent light is not focused on one point, but spreads over the entire light-receiving region of the optical fiber 31. The case is similar for divergent light emitted from points Q and R.

Figure 14D:
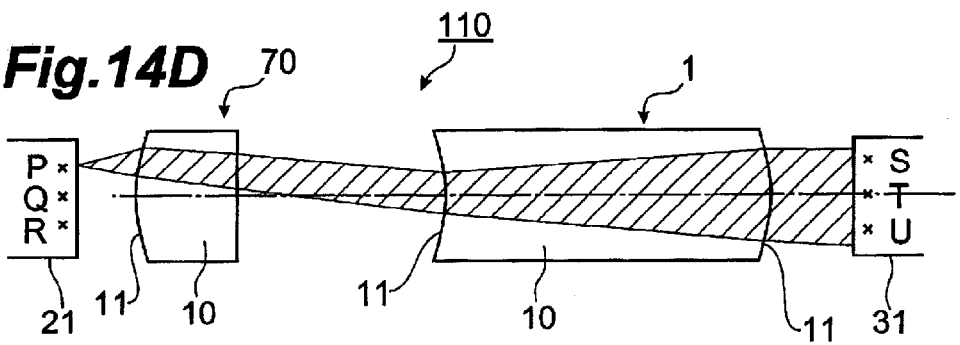

FIG. 14D is a plane view of the optical lens unit shown in FIG. 13B, indicating how incident light is acted upon. By placing an optical lens 70 between the light-emitting portion 21 and the optical lens 1, and forming the first optical action portion 11 on the incidence side of the optical lens 1 as a concave curved surface, light rays can be made to diverge over a short distance to reach the pitch of the columnar optical members 10, and as a result a Fourier type optical lens with a short lens configuration can be realized. This advantageous result is obtained using a concave curved surface; but in order to use a concave curved surface, it is essential that the incident light be condensed in advance by a convex curved surface. In this embodiment, simply by placing an optical lens in which columnar optical members 10 are formed integrally in an appropriate position, the above advantageous result can be obtained.

In the above optical lenses or optical lens units explained above, a first optical member array 2 which acts on incident light rays from a light-emitting device is embedded in a second optical member 3 in an integrally formed optical lens, so that the lens can be easily placed in a position such that each of the incident rays of light is acted upon, and manufacturing processes can be simplified.

By arranging the columnar optical members 10 in an array, the protruding and depressed portions of the convex curved surfaces of the columnar optical members 10 are covered by the second optical member 3 and are not exposed to the outside, so that dirt and the like does not accumulate on these portions. As a result, there is no blockage of emitted light, and an optical lens with excellent emission performance can be realized.

In the above embodiment, as the action on light rays, the case in which each light ray incident from a semiconductor laser array 20 is collimated and then output to an optical fiber array 30 is described; but instead of collimation, condensing may be performed.

Also, the case in which light emitted from the optical lens is received by optical fibers 31 was described; but use as the excitation light source of a solid-state laser is also possible.

Next, an embodiment of a stacked type optical lens of this invention is described in detail.

FIGS. 15A to 15D are perspective views showing a first embodiment of a stacked type optical lens of this invention; FIG. 16 is a partial enlarged view of the stacked type optical lens shown in FIG. 15A. Divergent light rays are emitted from a light-emitting device in which a plurality of semiconductor laser arrays, each having a plurality of light-emitting portions arranged in an array, are stacked in levels; the light rays are incident on the stacked type optical lens 120 shown in FIG. 15A, and the lens collimates each ray and then outputs the rays to the light-receiving portions of optical fibers or the like.

Figure 15A:
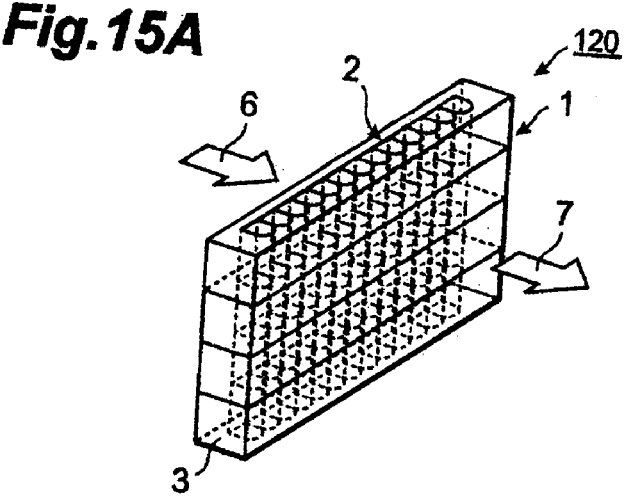
FIG. 15A to FIG. 15D are perspective views showing a first embodiment of a stacked type optical lens of this invention.
Figure 16:
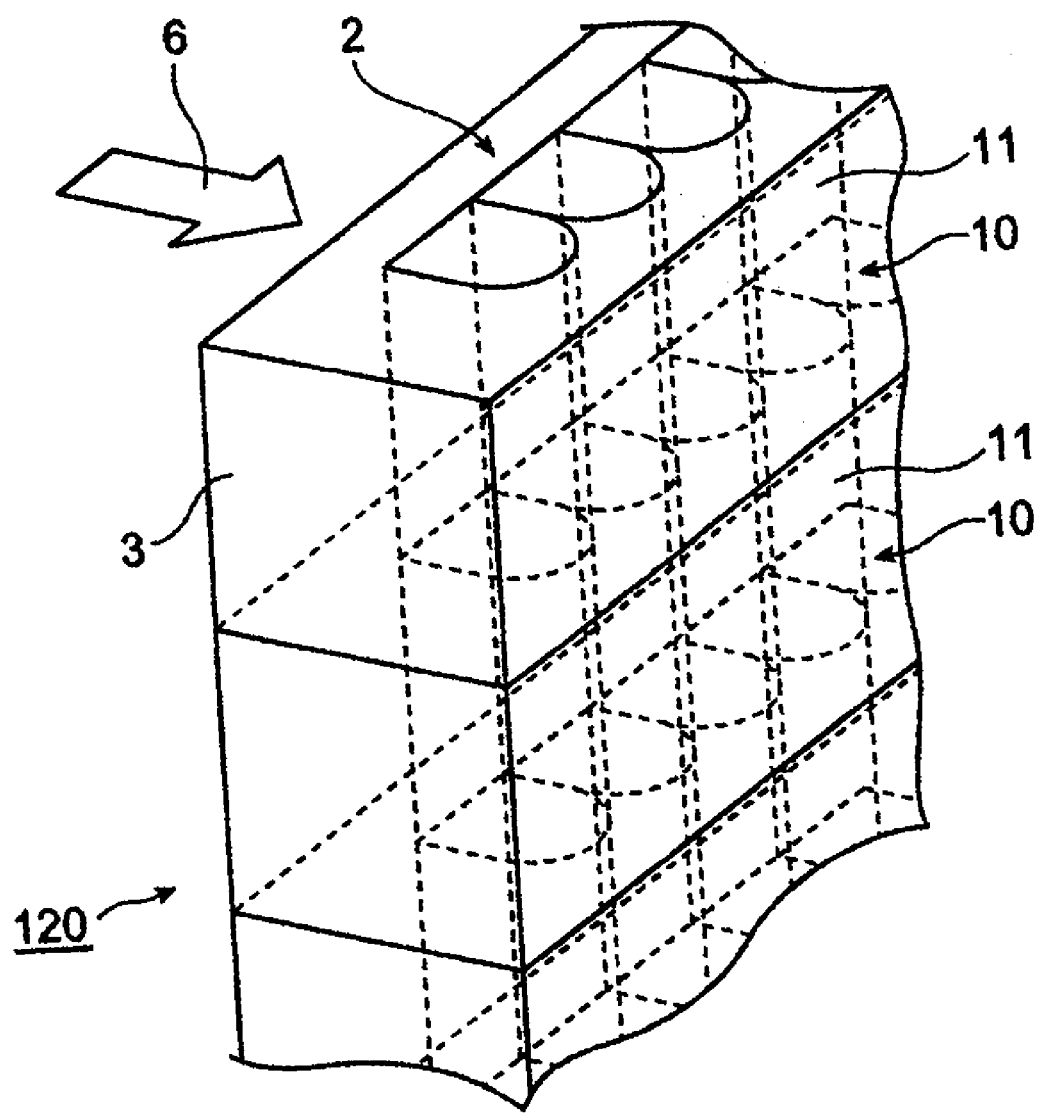
FIG. 16 is a partial enlarged view of the stacked type optical lens shown in FIG. 15A.

In the stacked type optical lens 120 of this first embodiment, optical lenses 1 shown in FIG. 15A are stacked in four levels; each of the optical lenses 1 is manufactured to correspond to a semiconductor laser array of a light-emitting device. Hence the stacked type optical lens 120 can be used together with semiconductor laser arrays stacked in four levels. The first optical action portions 11 may comprise convex curved surfaces formed with respect to the light incidence direction 6 (see FIG. 16). The second optical member 3 is formed in columnar shape from transparent material; the first optical member array 2 is embedded within, along the column axis direction.

In this stacked type optical lens 120, a first optical member array 2 acting on incident light from a light-emitting device is embedded in a second optical member 3 in an integral configuration, so that placement in a position enabling action on each incident light ray can be easily performed, and manufacturing processes can be simplified. Also, because the protruding and depressed portions due to the convex curved surfaces of the columnar optical members 10 formed by placing the columnar optical members 10 in an array are covered by the second optical member 3 and are not exposed to the outside, dirt or the like does not accumulate on these portions. Hence there is no blockage of emitted light, and a stacked type optical lens with excellent emission performance is realized. Also, because the first optical member arrays 2 are reinforced by the second optical members 3, a stacked type optical lens with excellent strength is obtained. And, because the stacked type optical lens 120 has the form of a plurality of the above-described optical lenses stacked in levels, the stacked type optical lens can be used together with a light-emitting device in which semiconductor laser arrays are stacked in a plurality of levels.

Figure 15B:
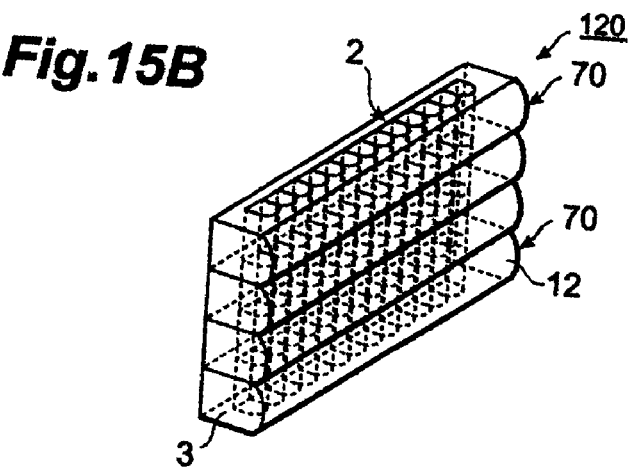
Figure 15C:
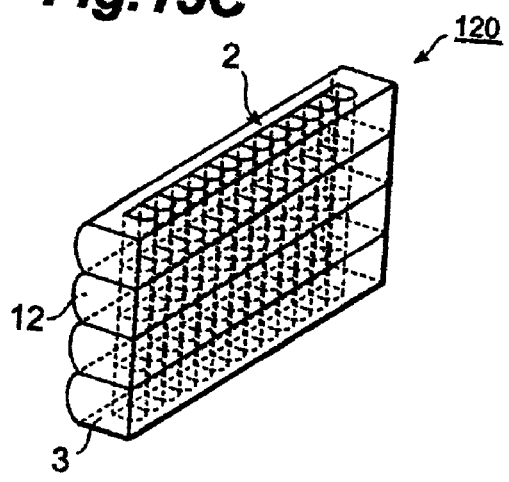
Figure 15D:
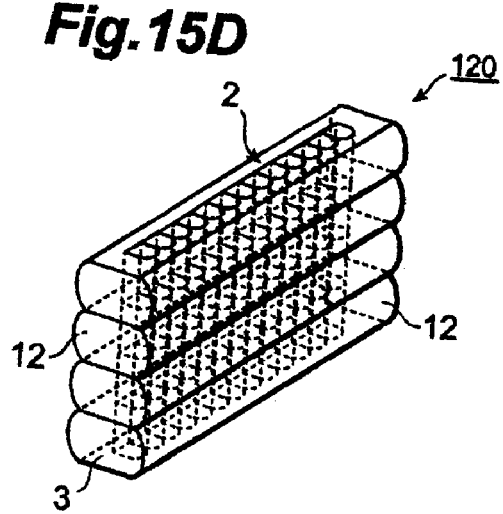

As shown in FIGS. 15B and 15C, each of the second optical members 3, stacked in four levels, may comprise a second optical action portion 12 which is formed as a convex curved surface on the emission side or on the incidence side, and which collimates each of the rays of light emitted from a light-emitting portion in the Y-axis direction. And as shown in FIG. 15D, each second optical member 3 may comprise second optical action portions 12 which are formed as convex curved surfaces on the incidence side and on the emission side, and which collimate each of the rays of light emitted from a light-emitting portion in the Y-axis direction. By this means, emitted light which is collimated in both the Y-axis and the X-axis directions is obtained.

As shown in FIGS. 15B to 15D, in a stacked type optical lens 120 of this first embodiment, the second optical member 3 is not present merely to embed the first optical member array 2. That is, because each lens is formed by two optical member each having separate collimating functions, it is possible to manufacture the stacked type optical lens with the refractive indices of the two types of optical member set appropriately (including, in addition to the refractive index of the optical members themselves, there fractive index due to the optical action portions formed by curved-surface shapes), and in particular with the refractive index difference set to a large value. As disclosed in Japanese Patent Laid-open No. H7-287104 or Japanese Patent Laid-open No.

H7-98402, it is also possible to utilize ion exchange on the outer face of the optical lens, to form lenses with different refractive index differences; but in this case, there is the problem that it is not possible to provide a sufficient refractive index difference between portions subjected to ion exchange and portions not thus subjected. Because the optical lens of this embodiment comprises different optical members, such problems are eliminated.

Figure 17:
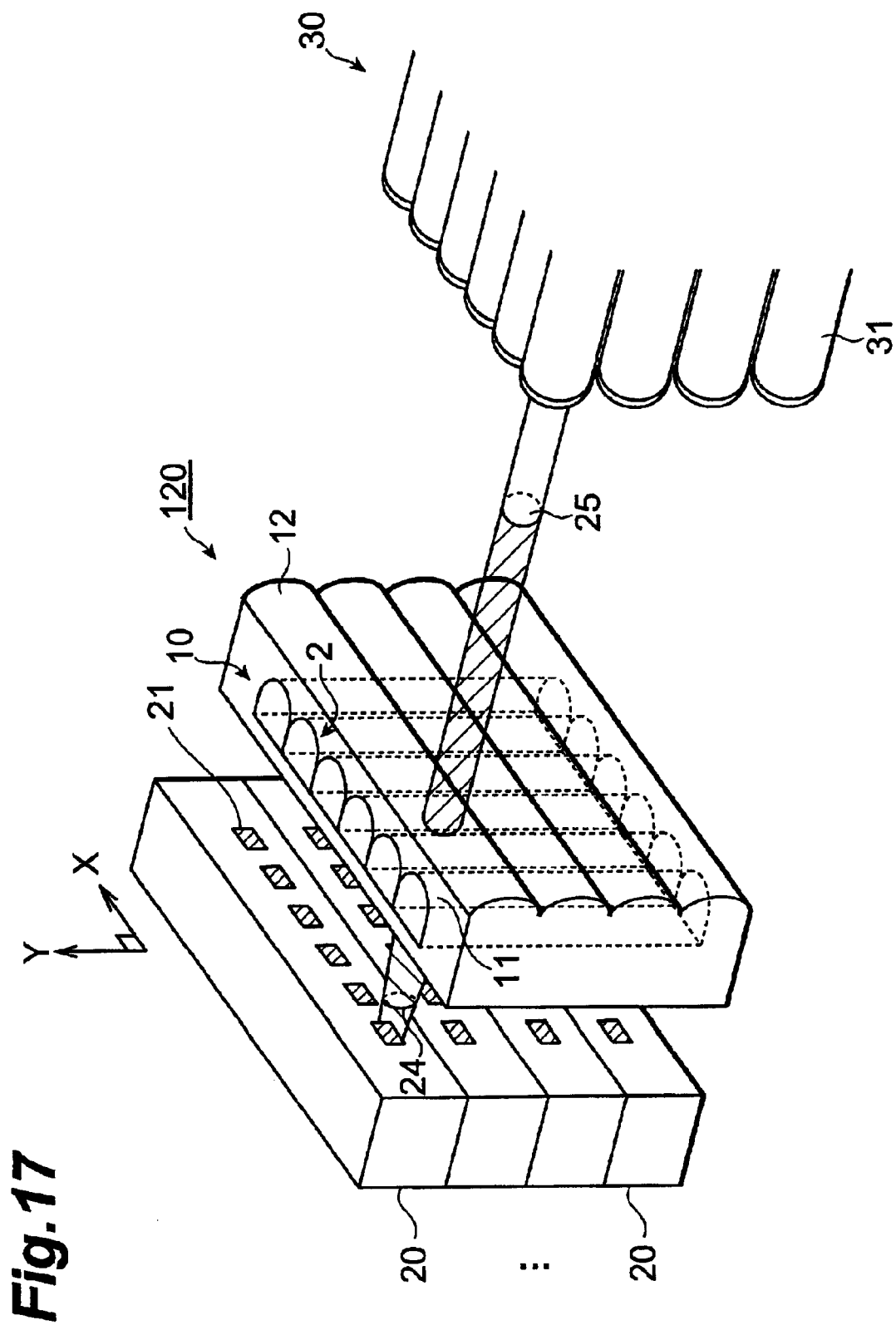
FIG. 17 is a schematic view of an optical system comprising a semiconductor laser array, stacked type optical lens, and optical fiber array.

FIG. 17 is a schematic view of an optical system comprising a semiconductor laser array, optical lens, and optical fiber array. In FIG. 17, four semiconductor laser arrays 20 stacked in the Y-axis direction are used as the light-emitting device; corresponding to this, the stacked type optical lens 120 has four levels of second optical action portions 12 on the light emission side, stacked in the Y-axis direction. This stacked type optical lens 120 is the stacked type optical lens shown in FIG. 15B. Also corresponding to this, as the light-receiving device, optical fiber arrays 30 stacked in four levels in the Y-axis direction, in each of which a plurality of optical fibers (light-receiving portions) 31 are arranged in an array, are used. The pitch of the columnar optical members 10 in the first optical member array 2 is designed to be equal to the pitch of the light-emitting portions 21 of the semiconductor laser array 20. As a result, simply by adjusting the position of the first optical member array 2 with respect to the semiconductor laser array 20, the positions of all the light-emitting portions 21 constituting the semiconductor array can be adjusted.

Each of the divergent light rays emitted from a semiconductor laser array 20 (light-emitting device array), in which a plurality of light-emitting portions 21 are arranged in an array, has a cross-section 24 which is longer in the Y-axis direction. These light rays are incident on columnar optical members 10 of the first optical member array 2, and are collimated in the X-axis direction by the first optical action portions 11 of the columnar optical members 10. Each of the light rays collimated in the X-axis direction by the columnar optical members 10 is collimated in the Y-axis direction by the second optical action portion 12, to obtain emitted light which has been collimated in both directions (cross-section 25). Each emitted light ray is received by a fiber 31 of the optical fiber array 30.

The stacked type optical lens 120 shown in FIGS. 15A to 15D is manufactured as follows. First, the manufacturing method of FIGS. 6A to 6C is used to manufacture an optical lens of the desired size; by grinding the spacer portions 46 of this optical lens, a second optical action portion is formed. By bonding together four optical lenses manufactured in this way in four levels, a stacked type optical lens 120 like that shown in FIGS. 15A to 15D is manufactured.

Figure 19A:
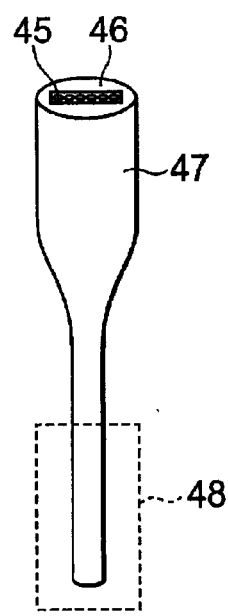
FIG. 19A to FIG. 19C are schematic views showing each of the processes of a method of manufacture of a stacked type optical lens by drawing.
Figure 19B:
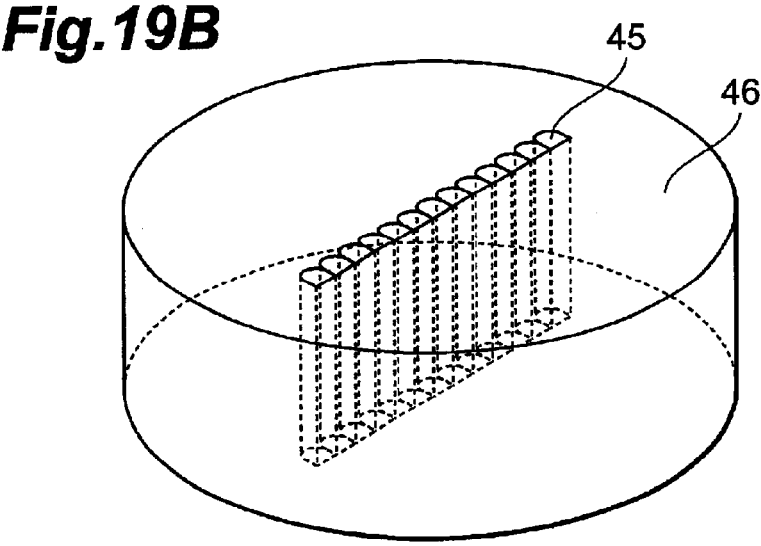
Figure 19C:
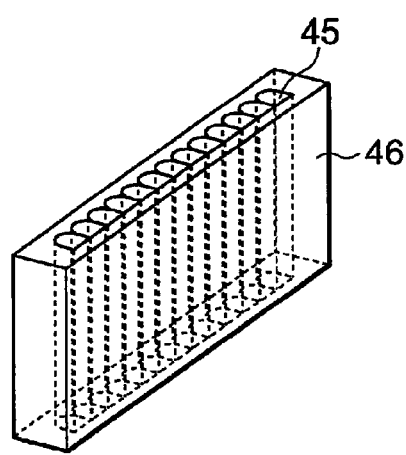

As shown in FIGS. 19A to 19C, when slicing the rod portion 48 shown in FIG. 19A, slicing may be performed such that the thickness becomes larger, shown in FIG. 19B, according to the number of levels of the semiconductor laser array 20. And as shown in FIG. 19C, by slicing away the excess portion of the spacer 46 and grinding its outer peripheral portion, a stacked type optical lens of the desired size is obtained. This process can also be used to form a second optical action portion as shown in FIGS. 15B to 15D and a condensing portion 67, described below. By means of this manufacturing method, the process of bonding together optical lenses can be eliminated.

Figure 18A:
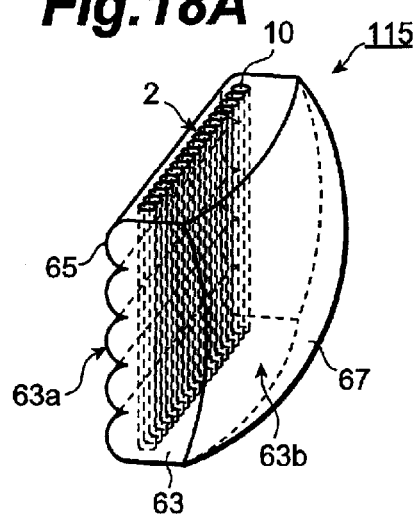
FIG. 18A to FIG. 18F are perspective views showing a second embodiment of a stacked type optical lens of this invention.
Figure 18B:
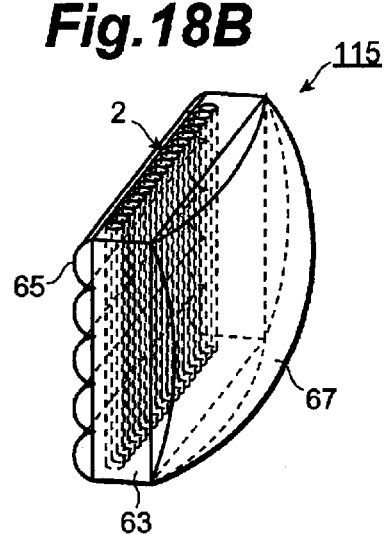
Figure 18C:
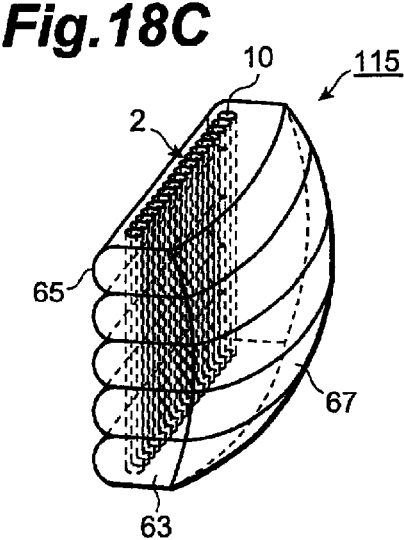
Figure 18D:
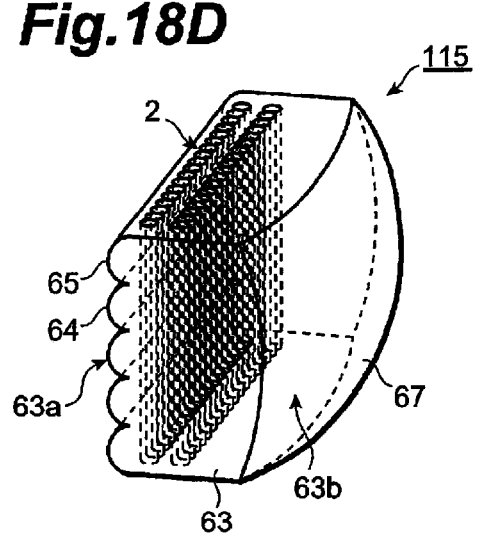
Figure 18E:
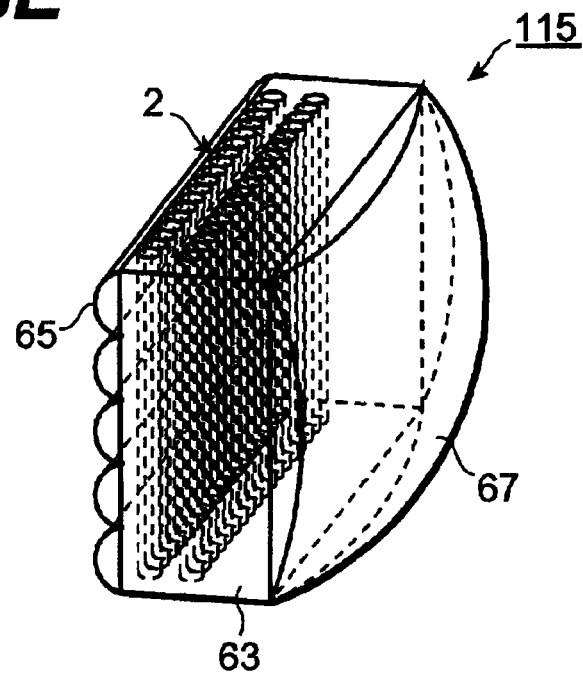
Figure 18F:
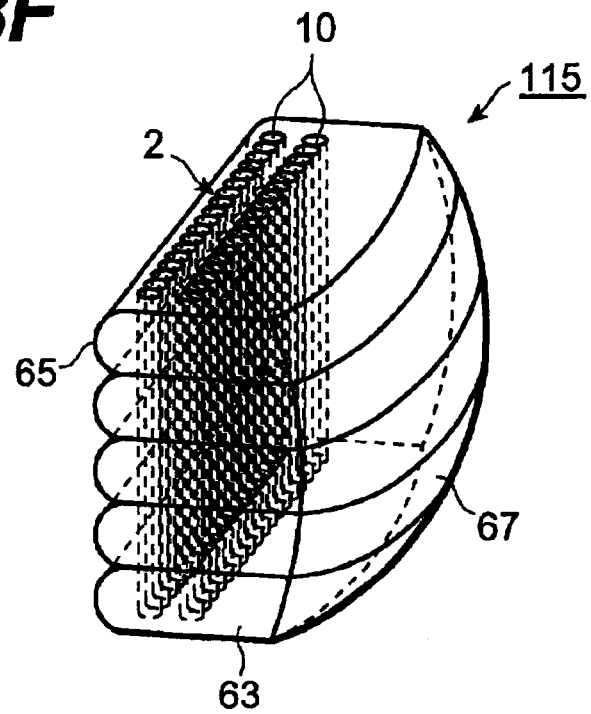

FIGS. 18A to 18F are perspective views showing a second embodiment of a stacked type optical lens of this invention. Similarly to FIGS. 15A to 15D, FIGS. 18 to 18F show a stacked type optical lens which has a form in which a plurality of levels (five levels) of single-level optical lenses are stacked. As each columnar optical member, a cylindrical optical member having curved surfaces on the light incidence side and on the light emission side is used. The second optical member 63 comprises a second optical action portion 65, forming a convex curved surface on each of the light incidence faces and collimating incident light in the Y-axis direction. The light emission face of the second optical member 63 functions overall as a condensing portion 67, acting on emitted light in the Y-axis and X-axis directions and condensing each emitted light ray to one place. FIGS. 18A to 18C show a stacked type optical lens 115 in which a first optical member array 2 is embedded in a row in a second optical member 63. FIGS. 18D to 18F show an optical lens 60 in which a first optical member array 2 is embedded in two rows in a second optical member 63. The stacked type optical lenses 115 shown in FIG. 18A and FIG. 18D are fabricated by integrally manufacturing optical lenses for each level using the manufacturing method shown in FIGS. 19A to 19C, and then grinding to form the second optical action portion 65 and condensing portion 67. Hence the second optical member 3 has a light incidence-side third face 63a and a light emission-side fourth face 63b on both sides of the first optical member array 2; the third face 63a has a plurality of curved surfaces 64, each having a second optical action portion 65 which acts in the Y-axis direction on incident light. These curved surfaces 64 are arranged along the Y-axis direction. The stacked type optical lenses 115 shown in FIG. 18B and FIG. 18E are fabricated by integrally manufacturing optical lenses for each level using the manufacturing method shown in FIGS. 19A to 19C, and then bonding portions corresponding to the second optical action portion 65 and condensing portion 67. The stacked type optical lenses 115 shown in FIGS. 18C and 18F are each fabricated by manufacturing optical lenses for each level using the manufacturing method shown in FIGS. 6A to 6C, and then, after grinding to form the second optical action portion 65 and condensing portion 67, bonding to stack the lenses. When integrally manufacturing a stacked type optical lens, the bonding process can be omitted. When later bonding a second optical action portion 65 and condensing portion 67, the member to be bonded can be freely selected, so that design changes and the like can be flexibly accommodated.

Figure 20:
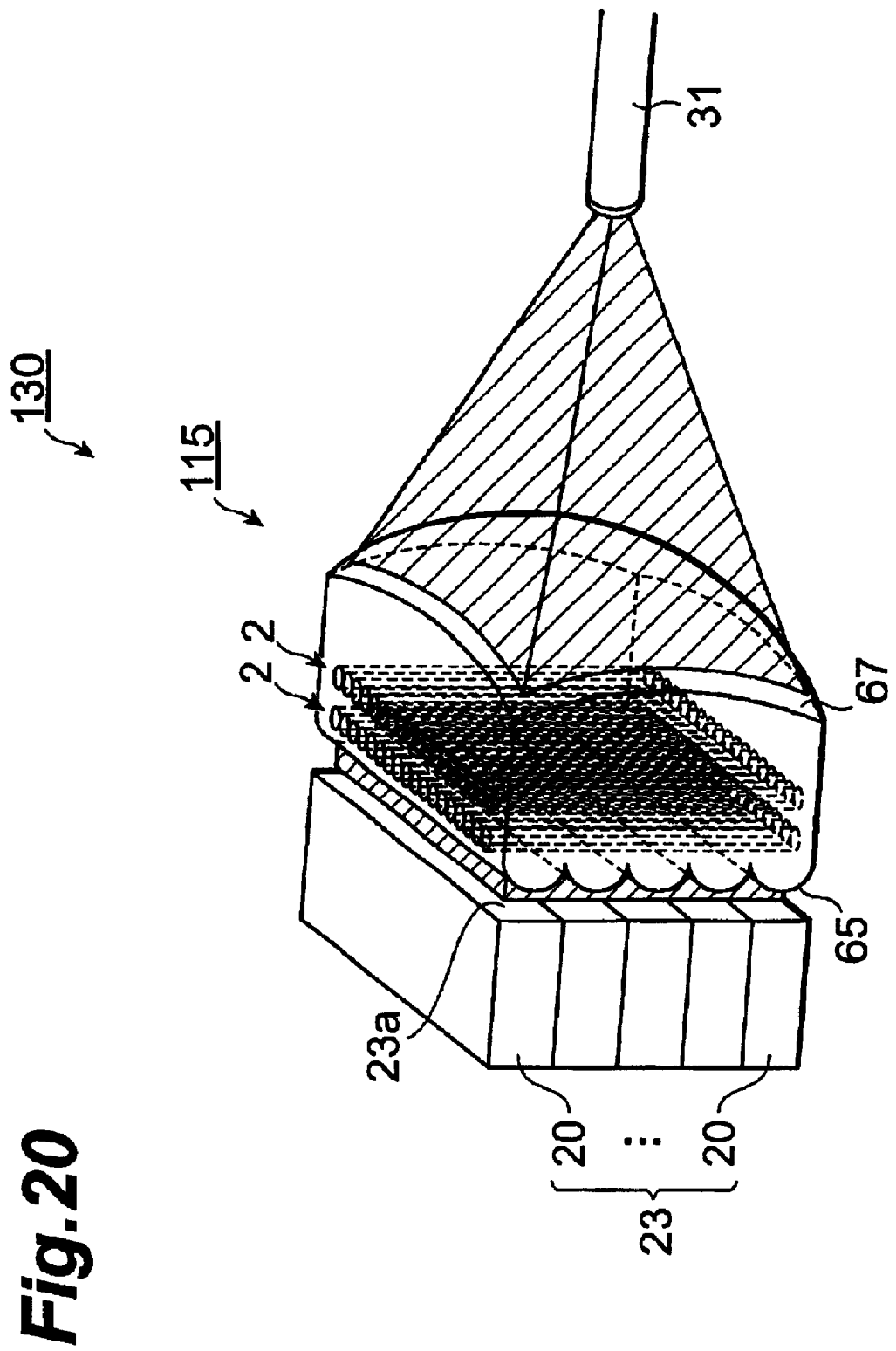
FIG. 20 is a schematic view showing an optical system using the stacked type optical lens shown in FIG. 18D.

FIG. 20 is a schematic view showing an optical system using a stacked type optical lens, and showing the action of the condensing portion which collimates incident light in the Y-axis and X-axis directions. This optical system 130 comprises a light-emitting device 23, in which semiconductor laser arrays 20 are stacked in a plurality of levels; a stacked type optical lens 115, positioned opposing the emitting faces 23a of the light-emitting device 23; and an optical fiber 31 (light-receiving portion) which receives light condensed by the stacked type optical lens 115. The semiconductor laser arrays 20 are stacked in five levels; the stacked type optical lens 115 also has the form of optical lenses stacked in five levels correspondingly. This stacked type optical lens 115 is shown in FIG. 18D. Each of the rays of light (divergent light rays) emitted from a light-emitting portion 21 is collimated in the Y-axis direction by a second optical action portion 65. Then, light rays are collimated in the X-axis direction by a first optical action portion of the first optical member array 2, arranged in two rows, and by this means each ray of light is collimated in each direction. Then, all rays of light are condensed at one place by the condensing portion 67, and are emitted from the stacked type optical lens 115. The condensed light is received by the optical fiber 31. Because each ray of light is condensed in one place, the optical output can for example be increased. In this optical system 130, an optical fiber 31 is shown as the light-receiving portion; however, a solid-state crystal as a laser diode-excited solid-state laser apparatus, or a collimating lens (having a convex-shape curved surface), maybe used as the light-receiving portion. When using a solid-state laser apparatus, a coherent output beam is created by semiconductor material excited by the light emitted from the condensing lens 67. When using a collimating lens, use as a parallel-light emission apparatus in optical communications or other applications is possible.

In the above stacked type optical lens of this embodiment, a case was described in which each ray of light incident from a semiconductor laser array 20 is collimated and output to an optical fiber array 30 is described as the action on the incident light; but in place of collimation, condensing may be performed instead.

Next, a third embodiment of an optical lens of this invention is explained.

Figure 21:
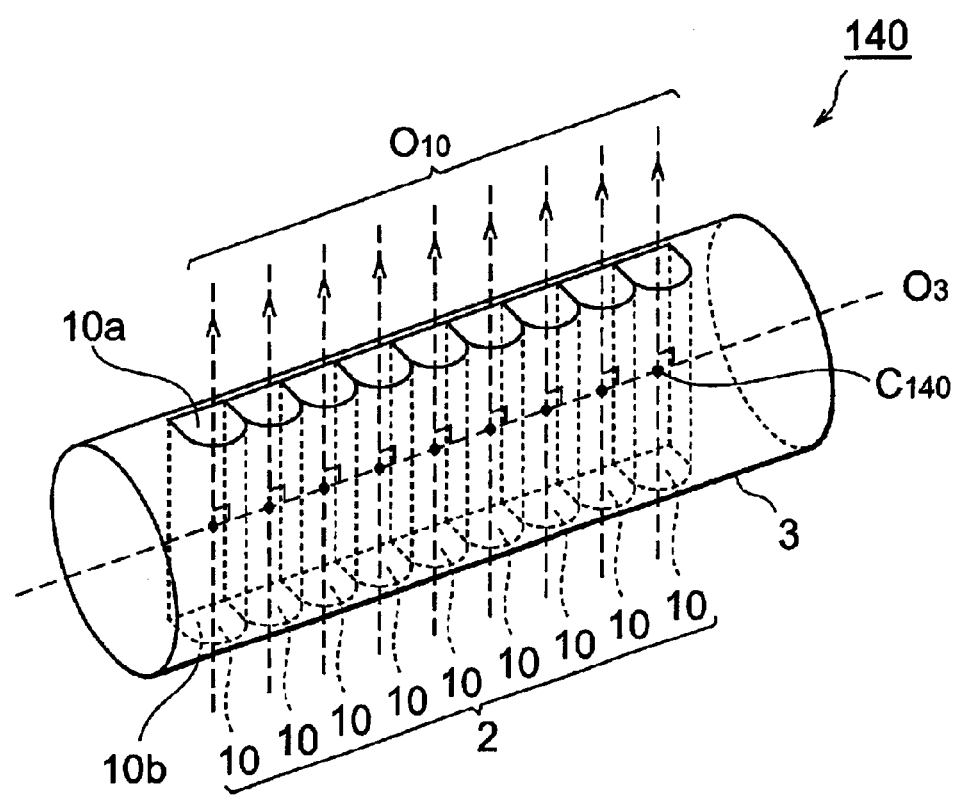
FIG. 21 is a perspective view showing a third embodiment of an optical lens of this invention.
Figure 22:
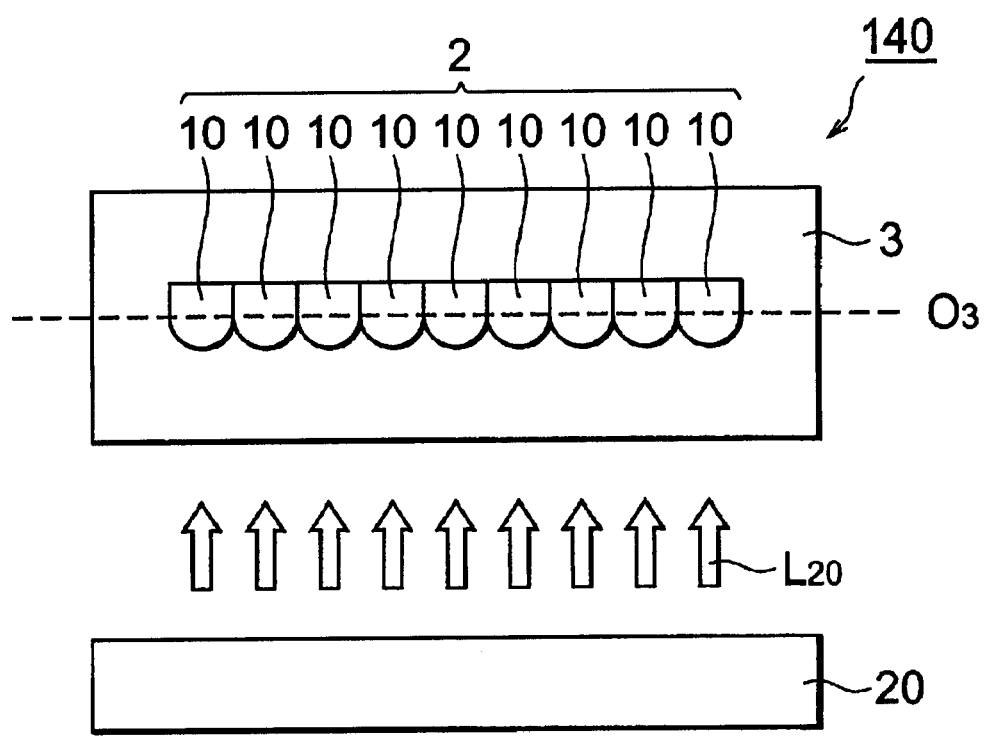
FIG. 22 is a view of the optical lens of FIG. 21, seen from the first axis direction of the columnar optical members.

FIG. 21 is a perspective view showing the third embodiment of an optical lens of this invention. FIG. 22 is a view of the optical lens of FIG. 21, seen from the first axis direction of the columnar optical members.

As shown in FIG. 21, the optical lens 140 of this embodiment comprises a first optical member array 2, comprising a plurality of columnar optical members 10, and a second optical member 3.

As the constituent materials of the columnar optical members 10 and second optical member 3 in the optical lens 140 of this embodiment, materials similar to those of the columnar optical members 10 and second optical member 3 of the optical lens 1 of the first embodiment are used. Hence as the constituent material of the columnar optical members 10 of the first optical member array 2, glass material with a refractive index higher than that of the transparent material of the second optical member 3 is used. In this case, a refractive index difference is provided, so that the first optical action portion 11 of the columnar optical members 10 functions effectively; and, because a material with higher refractive index than the transparent material of the second optical member 3 is used as the constituent material of the columnar optical members 10, each divergent light ray emitted from a semiconductor laser array is collimated by the convex curved surfaces of the first optical action portions 11 (in cases where a material with lower refractive index than the transparent material of the second optical member 3 is used as the constituent material of the columnar optical members 10, each divergent light ray emitted from the semiconductor laser array is collimated by a concave curved surface formed in the first optical action portions 11).

Here, when glass having a refractive index of 1.51 is used in the second optical member 3, by appropriately selecting the other glass material, a refractive index of for example approximately 1.83 can be set. Also, as shown in FIG. 22, the columnar optical members 10 have a bottom face with a shape in which one edge of a rectangle protrudes in a semicircular shape; hence one of the side faces of the columnar optical members 10 parallel to the first axis $O_{10}$ is a convex curved surface. This convex curved surface is a first collimating portion serving as the first optical action portion; at this first collimating portion of the columnar optical members 10, the components with small divergent angles of incident light, emitted from a light source having astigmatism, are collimated. The shape of the bottom face of the columnar optical members 10 is set in this way in order that, by extending the focal length of the columnar optical members 10 to the focal length of the second optical members 3, the difference in refractive indices of the second optical member 3 and the columnar optical members 10 can be effectively utilized to collimate two components of incident light with different divergent angles, as described above.

In the first optical member array 2, a plurality of columnar optical members 10 are formed integrally; the plurality of columnar optical members 10 are arranged in an array, with the respective first axes $O_{10}$ parallel in the same plane, and with the first collimating portion facing in the same direction. By thus arranging the columnar optical members 10 in an array and in mutual contact, light components emitted from a plurality of light sources with small divergent angles can be simultaneously collimated. In the following explanation, the face of the plane containing the plurality of first axes $O_{10}$ on the side of the first collimating portions, that is, the face on the side facing the light sources, shall be called the "incidence face".

The second optical member 3 is a cylinder-shape optical member formed from a transparent material. This second optical member 3 has a refractive index smaller than that of the columnar optical members 10. For example, when formed from glass, the refractive index is 1.51. The convex curved surface on the side face of the cylinder is a second collimating portion acting as a second optical action portion; the second collimating portion of the second optical member 3 collimates components of light, emitted from a light source having a stigmatism and having a large divergent angle. Within the second optical member 3, the entire first optical member array 2 described above is embedded such that the first axes $O_{10}$ are orthogonal to the second axis $O_3$ of the second optical member 3. In the following explanation, the points of intersection of the plurality of first axes $O_{10}$ and the second axis $O_3$ are referred to as the "incidence centers $C_{140}$".

The second collimating portion of the second optical member 3 and the first collimating portions of the columnar optical members 10 are finished aspherically as necessary, in consideration of spherical aberration. By this means, incident light rays can be rendered parallel with still greater precision.

In the optical lens 140 also, similarly to the optical lens 1 of the first embodiment, each of the plurality of columnar optical members 10 has two end faces 10a, 10b, and both the end faces 10a, 10b are exposed from the second optical member 3.

Further, antireflection film coating is formed, as necessary, on the face on which light is incident of the second collimating portion of the second optical member 3 and of the first collimating portions of the columnar optical members 10. By this means, losses due to reflection are reduced, and incident light can be rendered parallel with high efficiency.

The optical lens 140 shown in FIG. 21 can easily be manufactured by applying technology for manufacturing existing fiber optical plate. For example, a cylindrical tube 47 is drawn as shown in FIG. 6A, the rod portion 48 obtained from drawing is sliced as shown in FIG. 6B, the excess portion of the spacer 46 is sliced away as shown in FIG. 6C, and the outer perimeter of the sliced spacer 46 is ground to obtain a cylindrical-shape optical lens. As shown in FIGS. 5A to 5C, parent material with a shape such as that of the core 240 may be formed and then may be drawn, which is drawn. The core 240 is formed with a plurality of portions corresponding to the first optical action portion already arranged in a row and formed integrally. Hence in the processing of FIG. 5C, there is no need to arrange a plurality of cores in a row in the cylindrical tube 47.

Figure 23A:
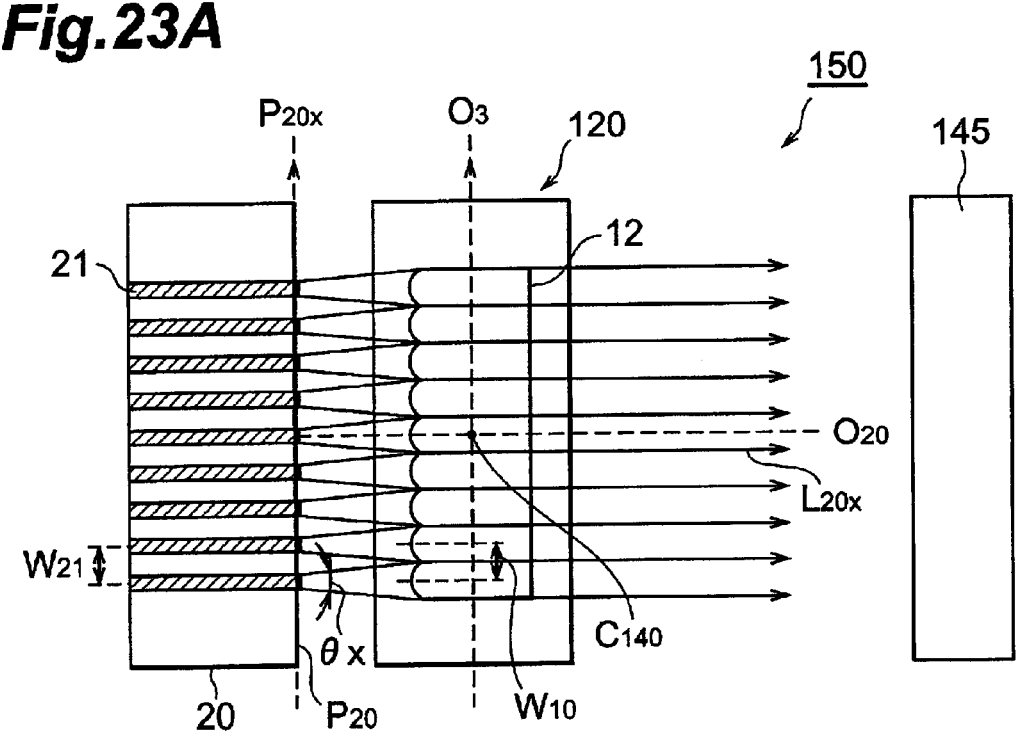
FIG. 23A and FIG. 23B are configuration diagrams for the case in which the optical lens of FIG. 21 is used as means to parallelize the rays of a semiconductor laser apparatus.
Figure 23B:
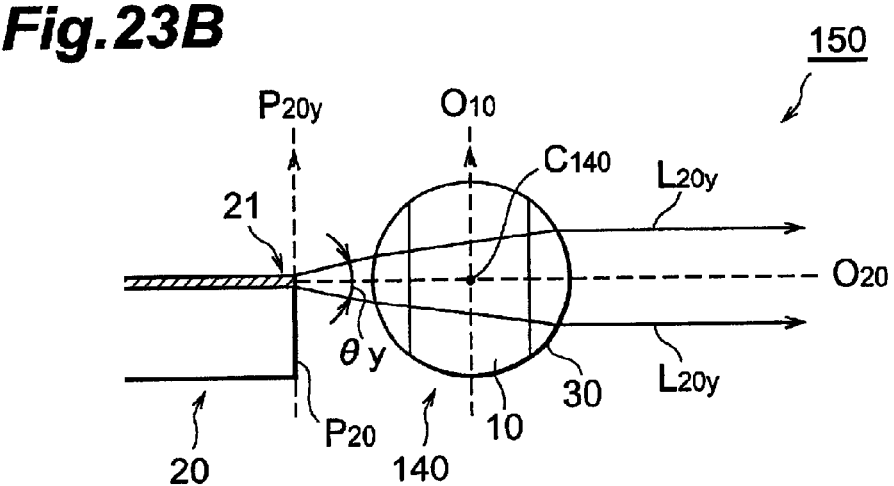

Next, operation in cases where the optical lens 140 shown in FIG. 21 is used as an optical system to render light parallel in a semiconductor laser apparatus 150 is explained, based on FIGS. 23A and 23B.

As shown in FIG. 23A, the semiconductor laser apparatus 150 has a semiconductor laser array 20; an optical lens 140, which parallelizes and outputs a plurality of emitted beams $L_{20}$ from the semiconductor laser array 20; and a condensing optical system 145, which condenses and outputs the beams collimated by the optical lens 140.

As shown in FIG. 23A, the optical lens 140 is formed, with the number of the columnar optical members 10 of the first optical member array 2 matched to the number of light-emitting portions 21 of the semiconductor laser array 20, and with the pitch $W_{10}$ of the columnar optical members 10 equal to the pitch $W_{21}$ of the light-emitting portions 21 of the semiconductor laser array 20. And as shown in FIGS. 23A and 23B, the incidence plane of the optical lens 140, formed by the first axis $O_{10}$ and the second axis $O_3$, is positioned to oppose and be parallel to the emission end face $P_{20}$ of the semiconductor laser array 20. That is, as shown in FIG. 23B, the optical lens 140 is positioned with respect to the semiconductor laser array 20 such that the first axis $O_{10}$ is parallel to the direction $P_{20Y}$ perpendicular to the activation layer of the emission end face $P_{20}$ of the semiconductor laser array 20, and also such that, as shown in FIG. 23A, the second axis $O_3$ is parallel to the direction $P_{20X}$ parallel to the activation layer of the emission end face $P_{20}$ of the semiconductor laser array 20; and is positioned such that the optical axes $O_{20}$ of the plurality of emitted beams $L_{20}$ from the semiconductor laser array 20 pass through the incidence centers $C_{140}$ of columnar optical members 10 in a one-to-one correspondence with these beams. At this time, the distance between the semiconductor laser array 20 and the optical lens 140 is set such that the parallel components $L_{20X}$, with small divergent angles, of the plurality of laser diode beams $L_{20}$ emitted from light-emitting portions 21 do not overlap.

By positioning the optical lens 140 with respect to the semiconductor laser array 20 in this way, the plurality of laser diode beams $L_{20}$ emitted from the light-emitting portions 21 of the semiconductor laser array 20 are collimated, with the perpendicular components $L_{20Y}$ having a large divergent angle $\theta_y$ collimated by the second optical member 3 as shown in FIG. 23B, and the parallel components $L_{20X}$ having a small divergent angle $\theta_x$ collimated by the columnar optical members 10, as shown in FIG. 23A. Collimated beams which are emitted from the second optical member 3, and collimated beams which are emitted from the columnar optical members 10, thus become extremely narrow light beams having an outer diameter approximately equal to the pitch $W_{21}$ of the light-emitting portions 21 of the laser diode array, and are efficiently condensed in the condensing optical system 145.

In this way, the optical lens 140 of this embodiment has a simple construction, and can easily be manufactured in a compact size using known manufacturing techniques. Consequently the size of the second optical member 3, and the number and size of the columnar optical members 10 of the first optical member array 2, can easily be adjusted during manufacturing according to the size and number of the plurality of light-emitting portions 21, arranged in an array at a pitch of order several hundred microns, of a semiconductor laser array 20, and according to the positioning space.

For example, even in the case of a semiconductor laser array having from 60 to 100 light-emitting portions per centimeter, which could not be used with a conventional prism array, it is easy to manufacture an optical lens of this invention at a size enabling one-to-one correspondence with the plurality of light-emitting portions; and because the columnar optical members 10 and second optical member 3 constituting the optical lens are formed integrally with the first axis and second axis mutually orthogonal, the second optical member 3 can collimate the components of the emitted beams in directions with large divergent angles, and at the same time the columnar optical members 10 can collimate the components of the emitted beams in directions with small divergent angles. Further, the optical lens can easily be placed in an appropriate position to enable efficient collimation of beams emitted by such a semiconductor laser array 20.

Because the optical lens 140 of this embodiment comprises columnar optical members 10 and a second optical member 3 having a refractive index different from that of the columnar optical members 10, it is possible to manufacture the optical lens with the refractive index difference between the two members set appropriately according to the mode of use. As disclosed in Japanese Patent Laid-open No. H7-287104 and in Japanese Patent Laid-open No. H7-98402, it is also possible to utilize ion exchange at the outer faces of the same optical lens to form lenses having different refractive index differences; but in this case, there are the problems that it is not possible to provide a sufficient refractive index difference between portions subjected to ion exchange and portions not thus subjected, and that a sufficient refractive index difference also cannot be provided while accurately forming the curved-surface shape of the optical action portion. Because the optical lens of this embodiment comprises different optical members, such problems are eliminated.

Further, in the optical lens 140, the first collimating portions, which are the first optical action portions of the plurality of columnar optical members 10, are covered by the second optical member 3 and are not exposed to the outside. Consequently even if protruding and depressed portions are formed by the convex curved surfaces of each of the columnar optical members 10 as a result of arrangement of the columnar optical members 10, dirt and the like does not accumulate on these protruding and depressed portions. Hence adverse affects on the optical emission performance due to dirt and the like are adequately prevented. Also, all of the plurality of columnar optical members 10 are embedded in the second optical member 3 and formed integrally. Consequently placement in a position enabling action by the plurality of columnar optical members 10 on light rays incident from a light-emitting device having a plurality of light-emitting portions can be performed easily. And, because the first optical member array 2 is reinforced by the second optical member 3, the optical lens is excellent in strength.

Figure 24A:
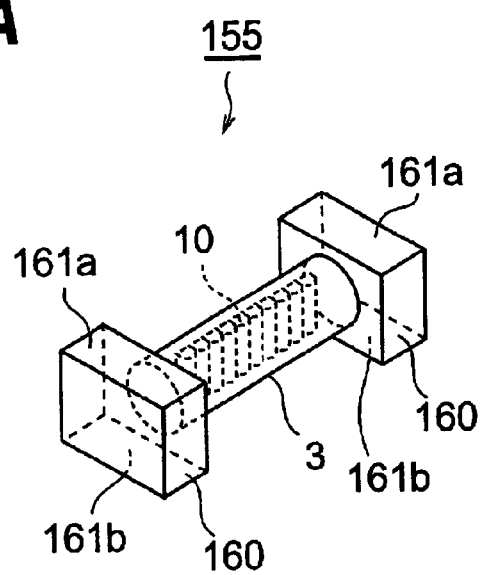
FIG. 24A and FIG. 24B are perspective views showing a fourth embodiment of an optical lens of this invention.
Figure 24B:
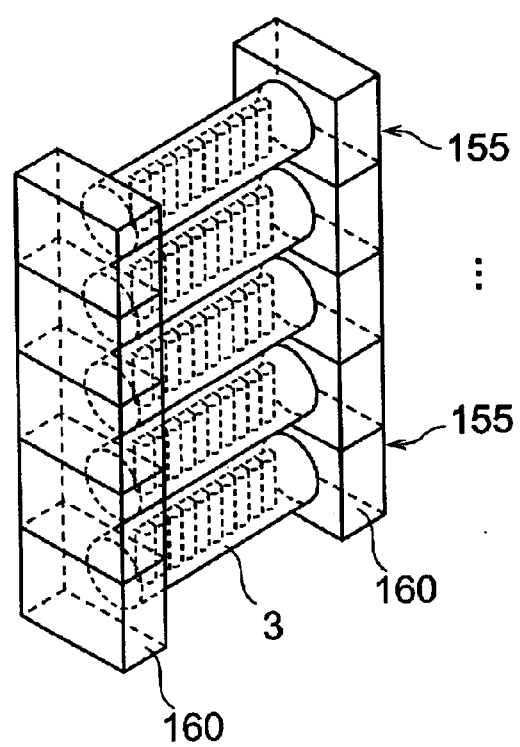

FIGS. 24A and 24B are perspective views showing a fourth embodiment of an optical lens of this invention. As shown in FIG. 24A, in the optical lens 155 of this embodiment, a pair of rolling prevention means 160 are provided at both ends of the cylindrical second optical member 3. The pair of rolling prevention means 160 both have a rectangular solid shape, and are designed such that, when one face of each rectangular solid is mounted on a substrate on which a semiconductor laser array 20 is mounted, and on a semiconductor laser array 20, or the like, the first and second collimating portions are in positions (angles) enabling effective functioning. Because the mounting angle of the optical lens 155 is thus determined, installation of the optical lens 155 on a laser diode array is easy, and adjustment of focal lengths is also accomplished easily. Because rolling of the second optical member 3 is reliably prevented by the rolling prevention means 160, when mounting the second optical member 3 on a semiconductor laser array, the mounting operation is extremely easy. The pair of rolling prevention means 160 both have a rectangular solid shape, and the pair of rolling prevention means 160 have planar faces 161a, 161b which are mutually parallel and orthogonal to the first axis $O_{10}$. Hence when stacking optical lenses 155 in a plurality of levels, as shown in FIG.

24B, by causing rolling prevention means 160 of adjacent optical lenses 155 to be in mutual contat at the planar faces 161a, 161b, it is easy to stack a plurality of optical lenses 155, and the operation of mounting with respect to a light-emitting device in which semiconductor laser arrays are stacked in a plurality of levels is made easy (this is particularly effective when the optical lenses are cylindrical lenses, since the lenses cannot be stacked in their current state). By this means, when semiconductor laser arrays are stacked, a stacked type optical lens can be provided corresponding to each of the light-emitting portions of the semiconductor laser arrays.

Figure 25A:
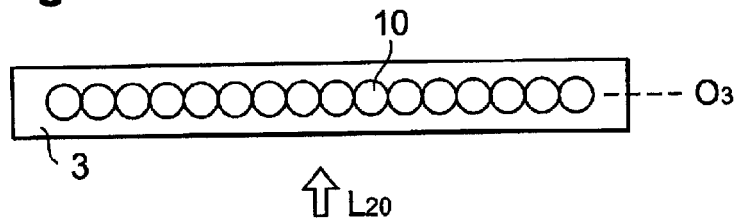
FIG. 25A to FIG. 25L are views showing various shapes of the second optical member and columnar optical members constituting an optical lens.
Figure 25B:
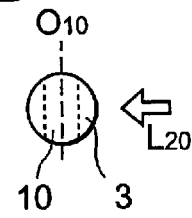
Figure 25C:
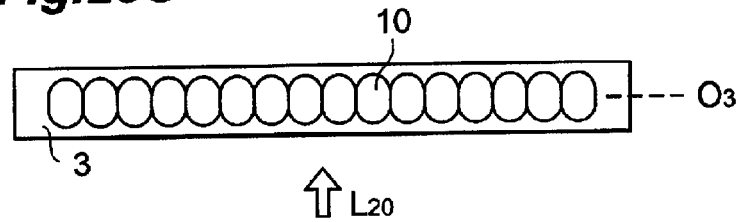
Figure 25D:
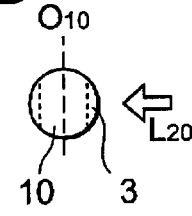
Figure 25E:
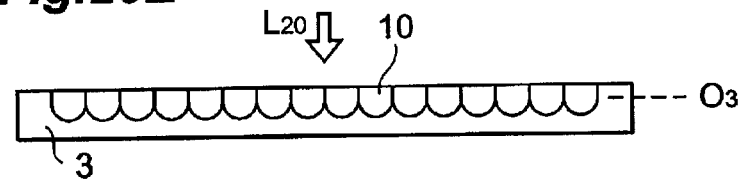
Figure 25F:
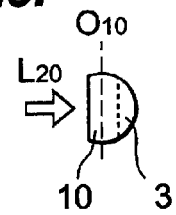
Figure 25G:
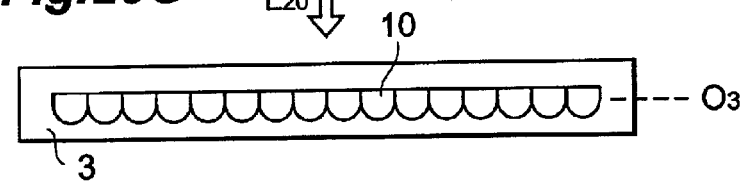
Figure 25H:
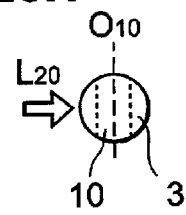
Figure 25I:
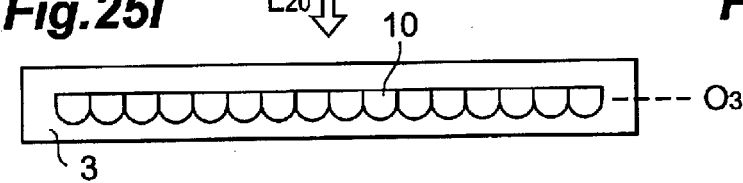
Figure 25J:
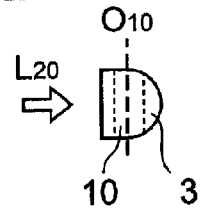
Figure 25K:
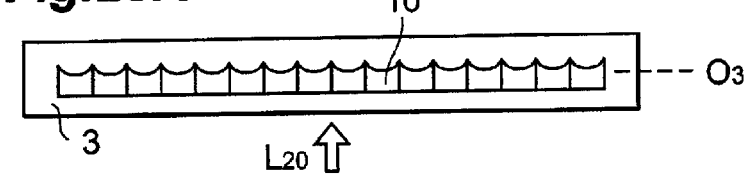
Figure 25L:
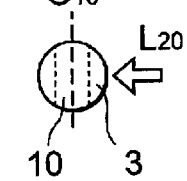

FIGS. 25A to 25L are figures showing various shapes of the second optical member 3 and columnar optical members 10 constituting an optical lens 140. In these figures, FIGS. 25A and 25B, FIGS. 25C and 25D, FIGS. 25E and 25F, FIGS. 25G and 25H, FIGS. 25I and 25J, and FIGS. 25K and 25L correspond; the former of each of these is a plane view of an optical lens 140, and the latter shows a side-face view of the same optical lens 140 as in the former; the side face is parallel to the plane which is perpendicular to the second axis $O_3$. As shown in FIGS. 25A to 25L, the side-face shape of the optical lens 140 may be circular, elliptical, or semicircular; the side-face shape of the second optical member 3 may also be semicircular, as shown in FIGS. 25F and 25J. The side-face shape and the cross-sectional shape are identical. Also, if incident light can be collimated, the refractive index of the second optical member 3 may be higher than that of the columnar optical members 10. For example, as shown in FIGS. 25K and 25L, by forming the face of the first collimating portion of the columnar optical members 10 and the face on the opposing emission side into concave curved surfaces, incident light can be collimated.

Further, the optical lens 140 can be easily manufactured in a compact size and having a simple construction, and can be installed in an extremely small installation space, and so can be easily manufactured according to the rigorous installation conditions of an optical system on the light-source side comprising numerous minute light sources arranged in an array, or of the optical system on an illumination-side having a plurality of illumination spots arranged in an array. And, it is possible to collimate incident light rays from such a plurality of light sources independently for each light source, and to cause the collimated emitted light to illuminate independently on such a plurality of illumination spots. For example, an optical lens 140 which is compact and has a short focal length can easily be placed in an extremely small space near the emission end face of a laser diode, so that the plurality of beams emitted from the laser diode can be independently collimated.

In the above optical lens 140, it is sufficient that the first collimating portion of the columnar optical members 10 be embedded within the second optical member 3; the portions other than the first collimating portion may protrude from the second optical member 3. In this case, the first axes and second axis are not perpendicular in the incidence plane comprised by the first axes, but are positioned so as to form right angles at prescribed intervals. Also, in this case there is no point corresponding to the incidence center $C_{140}$ shown in FIG. 21, FIG. 23A or FIG. 23B; instead, a straight line is postulated which is perpendicular to the first axes and is also perpendicular to the second axis, and the point of perpendicular intersection of this postulated straight line with the first axis is the incidence center of a columnar optical member 10, while the point of perpendicular intersection of this postulated straight line with the second axis is the incidence center of the second optical member 3.

Here the case in which a single optical lens collimates laser diode beams from a laser diode array has been explained; but a plurality of optical lenses 140 maybe formed integrally with the respective second collimating portions facing in the same direction, and formed in the manner of a fly-eye lens, and used for example parallel to and opposing the emission end face of a light source in which laser diode arrays are stacked.

Figure 26A:
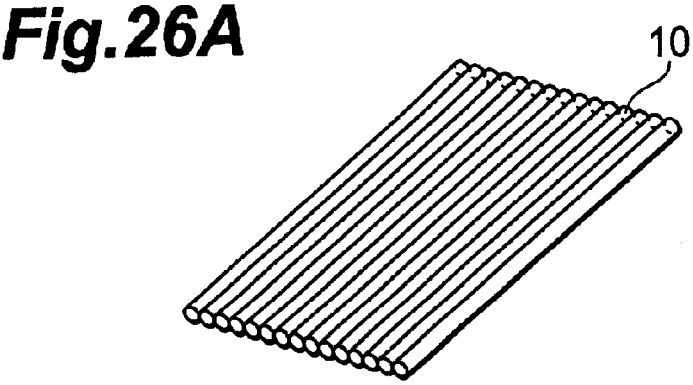
FIG. 26A to FIG. 26C are schematic diagrams showing another method of manufacture of an optical lens; and, FIG. 27 is a perspective view showing the characteristics of laser beams emitted from the light-emitting portions of a semiconductor laser array.
Figure 26B:
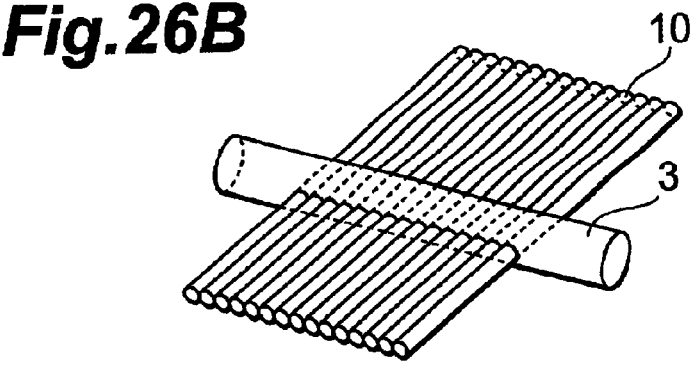
Figure 26C:
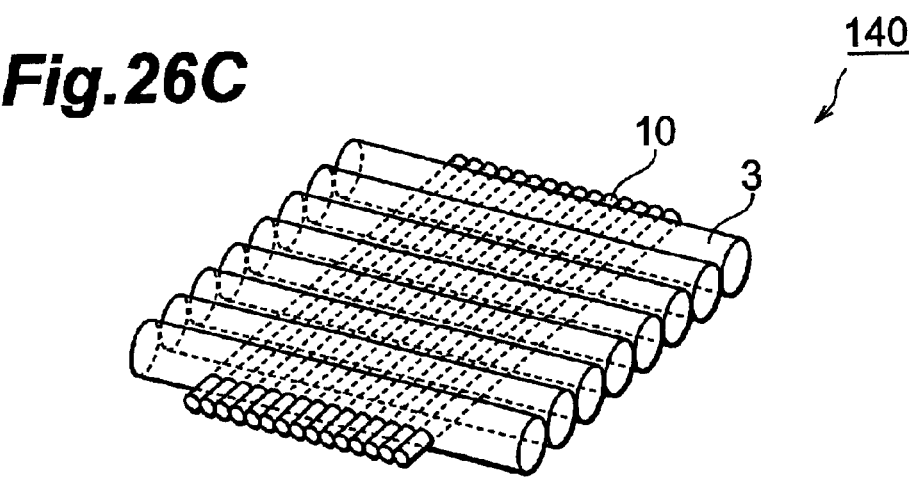
Figure 27:
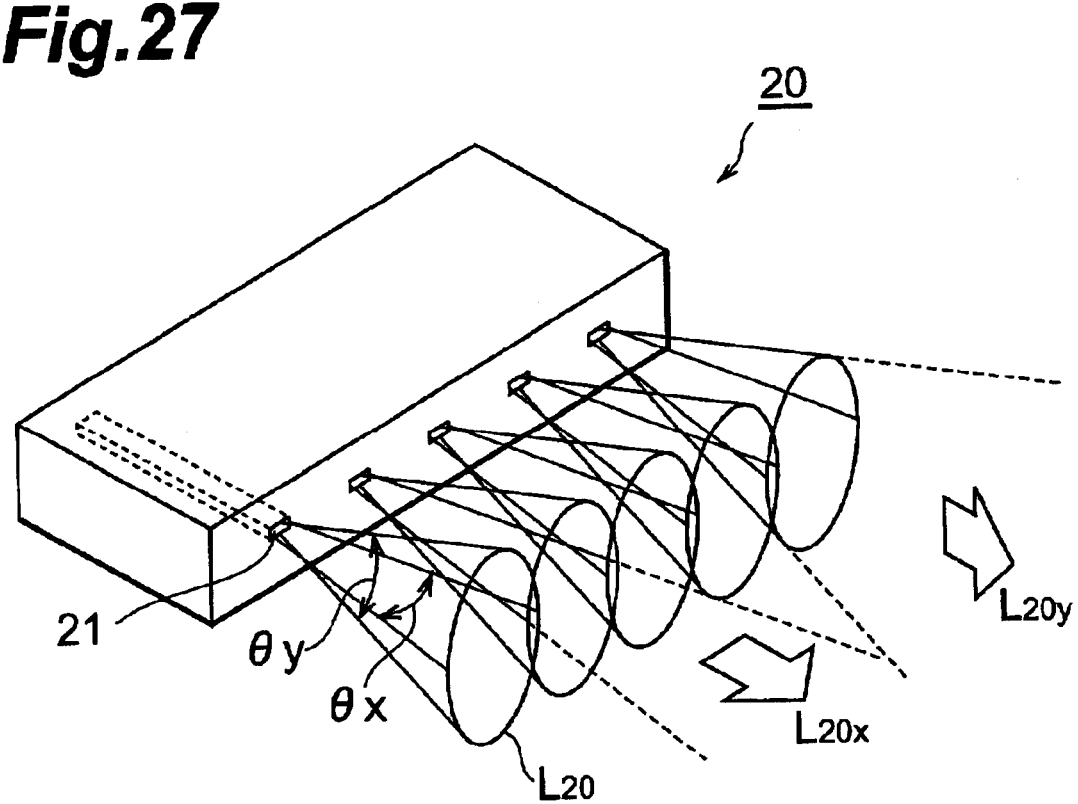

When the constituent material of the columnar optical members 10 has a higher softening point than the constituent material of the second optical member 3, manufacturing as shown in FIGS. 26A to 26C is also possible. That is, as shown in FIG. 26A, columnar optical members 10 are fabricated in advance in a prescribed shape from a constituent material with a high softening point, and a plurality of such members are arranged in an array. Then, as shown in FIG. 26B, material with a low softening point is melted in the vicinity of the array of columnar optical members 10 and caused to flow inward, to form the second optical member 3. As shown in FIG. 26C, a plurality of optical lenses may be formed integrally as necessary for use with a laser diode array stack. For example, a combination of plastic materials with different softening points, or a combination of a plastic material and a high-softening-point glass material or the like may be selected as the combination of constituent materials for the second optical member 3 and columnar optical members 10.

In the above embodiment, the case in which a semiconductor laser array is used as the light source for light rays incident on the optical lens 140 is explained; however, no particular limitations are placed on the light source for the optical lens 140, and another light source having astigmatism may be used.

In the above embodiment, the case was explained in which manufacturing is performed with the size of the second optical member 3, and the size and number of the columnar optical members 10 in the first optical member array 2, set according to the placement conditions of light sources arranged in an array; however, the optical lens 140 can also be easily manufactured with these parameters adjusted according to the conditions of placement of a plurality of illumination spots, arranged in an array on the side of emission of collimated light rays. By thus associating, in a one-to-one correspondence, the first collimating portions of the plurality of columnar optical members 10 constituting the first optical member array 2 with a plurality of illumination spots arranged in an array, the plurality of collimated emitted light rays can be made to illuminate together a plurality of corresponding illumination spots at desired positions. For example, the optical lens 140 can be used as a focusing lens array used in a facsimile system or other image formation apparatus.

In the above embodiment, the first optical action portion and second optical action portion were explained as a first collimating portion and second collimating portion to collimate light rays emitted from a laser diode device; however, use as a first condensing portion and second condensing portion, which condense light rays emitted from a laser diode device, is also possible, according to the size and other conditions of the optical fibers or other light-receiving devices.

The present invention is not limited to the above embodiments which merely show the best modes in carrying out the present invention, and includes all variations in shapes, sizes, positions, configurations or the like within the scope of the claims of the present invention.

What is claimed is:

1. An optical lens, which, after acting upon each light ray emitted from a light-emitting device in which a plurality of light-emitting portions are arranged in an array, emits said light rays, comprising:

one or a plurality of a first optical member arrays, each having a plurality of columnar optical members comprising first optical action portions in which a curved surface is formed on either the light incidence side or the light emission side and which act in the X-axis direction on light rays emitted from said light-emitting portions, and in which said columnar optical members are arranged in an array in the same plane; and, a second optical member, formed from a transparent material into a columnar shape, within which said one or plurality of first optical member arrays are embedded in parallel along the column axis direction; and wherein the refractive index of the constituent material of said columnar optical members and the refractive index of said transparent material of said second optical member are different.

2. The optical lens according to claim 1, wherein the thermal expansion coefficient of the constituent material of said columnar optical members is higher than the thermal expansion coefficient of the transparent material of said second optical member.

3. The optical lens according to claim 1, wherein the yield point of the constituent material of said columnar optical members is higher than the yield point of the transparent material of said second optical member.

4. The optical lens according to claim 1, wherein said columnar optical members are arranged in mutual contact in an array.

5. The optical lens according to claim 4, wherein each of said columnar optical members has a pair of contact planar faces, mutually parallel and formed on side faces, and in said first optical member array, said columnar optical members are arranged with said contact planar faces in mutual contact.

6. The optical lens according to claim 1, wherein said columnar optical members are formed integrally.

7. The optical lens according to claim 1, wherein said second optical member comprises a second optical action portion in which a curved surface is formed, and which acts on either incident light or on emitted light.

8. The optical lens according to claim 7, wherein said curved surface of said second optical action portion is formed on the emission face of said second optical member, and acts in the X-axis direction on each ray of light emitted from each of said light-emitting portions.

9. The optical lens according to claim 7, wherein said curved surface of said second optical action portion is formed on either the incidence face or the emission face of said second optical member, and acts in the Y-axis direction on each ray of light emitted from each of said light-emitting portions.

10. An optical lens unit, comprising:
an optical lens according to claim 1; and,
a juxtaposed optical lens, which is juxtaposed with said optical lens, and which includes a third optical action portion which acts in the Y-axis direction on each ray of light emitted from each of said light-emitting portions.

11. The optical lens unit according to claim 10, wherein said juxtaposed optical lens has a third optical member, comprising a third optical action portion, and a fourth optical member, formed from a transparent material and within which said third optical member is embedded.

12. An optical lens unit, in which the optical lenses according to claim 1, which comprise one said first optical member array, are arranged in two parallel rows.

13. The optical lens unit according to claim 12, wherein said second optical member of either of the optical lenses among said two rows of optical lenses arranged in parallel comprises a second optical action portion, which is formed from a curved surface on either the light incidence face or the light emission face of said second optical member, and which acts in the Y-axis direction on each ray of light emitted from each of said light-emitting portions.

14. The optical lens unit according to claim 13, wherein:
said first optical member array, of the optical lens arranged on the emission side among said two rows of optical lenses arranged in parallel, has a plurality of said columnar optical members each comprising a first optical action portion which is formed as a curved surface on the light incidence side and the light emission side, and which acts on each ray of light emitted from each of said light-emitting portions; and,
said first optical member array, of the optical lens arranged on the incidence side among said two rows of optical lenses arranged in parallel, has a plurality of said columnar optical members each comprising a first optical action portion which is formed as a curved surface on the light incidence side, and which acts on each ray of light emitted from each of said light-emitting portions.

15. An optical lens unit, comprising:
an optical lens unit according to claim 12, and a juxtaposed optical lens, which is juxtaposed in parallel with said two rows of optical lenses, and which comprises a third optical action portion which acts in the Y-axis direction on each ray of light emitted from each light-emitting portion.

16. An optical system, comprising:
a light-emitting device, in which a plurality of light-emitting portions are arranged in an array;
an optical lens according to claim 1, which acts on each ray of light emitted from said light-emitting device; and,
a light-receiving device, in which one or a plurality of light-receiving portions are arranged in an array to receive light emitted from said optical lens.

17. A stacked type optical lens, which, after acting on each of the rays of light emitted from a light-emitting device in which a plurality of light-emitting portions are arranged in an array, emits said light rays, and which has a form in which optical lenses according to claim 1 are stacked in a plurality of levels.

18. The stacked type optical lens according to claim 17, wherein:
said second optical members in each level each comprise a second optical action portion, in which a curved surface is formed in the light incidence face of said second optical member, and which acts in the Y-axis direction on each incident light ray; and,
said second optical members in each level each comprise a condensing portion, in which a curved surface is formed in the entire light emission face, and which acts in the Y-axis direction and in the X-axis direction on each emitted light ray, to condense each ray in one place.

19. An optical system, comprising:
a light-emitting device, in which a plurality of light-emitting portions are arranged in an array;
a stacked type optical lens according to claim 17, which acts on each light ray emitted from said light-emitting device; and,
a light-receiving device, in which one or a plurality of light-receiving portions are arranged in an array, and which receives light emitted from said stacked type optical lens.

20. The optical lens according to claim 1, wherein the two end faces of each of said columnar optical members are exposed outside of said second optical member.

21. An optical lens, comprising:
one or a plurality of first optical member arrays, each having a plurality of columnar optical members arranged along the X-axis direction, and each having a first optical action portion, formed as a curved surface in each of said plurality of columnar optical members, which acts in said X-axis direction on light incident on said columnar optical members; and,
a second optical member, which constrains said plurality of columnar optical members of said first optical member array and covers said first optical action portions of said plurality of columnar optical members, and which is formed from a transparent material;
wherein the refractive index of the constituent material of said columnar optical members and the refractive index of said transparent material of said second optical member are different.

22. An optical lens unit, comprising:
an optical lens according to claim 21, and
a juxtaposed optical lens, juxtaposed with said optical lens, and comprising a third optical action portion which acts in the Y-axis direction on incident light.

23. The optical lens according to claim 21, wherein the two end faces of each of said columnar optical members are exposed outside of said second optical member.

24. A stacked type optical lens, comprising:
one or a plurality of first optical member arrays, each having a plurality of columnar optical members arranged along the X-axis direction, and each having a first optical action portion, formed as a curved surface in each of said plurality of columnar optical members, which acts in said X-axis direction on light incident on said columnar optical members; and,
a second optical member, formed from a transparent material, and having third and fourth faces formed on opposite sides of said first optical member array, at least one of said third face and said fourth face having a plurality of curved surfaces each having a second optical action portion which acts in the Y-axis direction on incident light.

25. An optical lens, comprising:
a first optical member array, having a plurality of columnar optical members formed from a transparent material into columnar shapes such that a first optical action portion formed from a curved surface parallel to a first axis is included in the outer face on at least one side, and with said plurality of columnar optical members arranged in an array such that said plurality of first axes are within a prescribed plane and mutually parallel; and,
a second optical member, formed into a columnar shape from a transparent material having a refractive index different from the refractive index of said columnar optical members, such that a second optical action portion formed from a curved surface parallel to the second axis is included in the outer face on at least one side, and in which at least said first optical action portions of said first optical member array is embedded such that said second axis is perpendicular to said plurality of first axes;
wherein said first and second optical action portions act on light along an optical axis orthogonal to said prescribed plane.

26. The optical lens according to claim 25, wherein the transparent material of said columnar optical members has a thermal expansion coefficient higher than the thermal expansion coefficient of the transparent material of said second optical member.

27. The optical lens according to claim 25, wherein the transparent material of said columnar optical members has a yield point higher than the yield point of the transparent material of said second optical member.

28. The optical lens according to claim 25, wherein said columnar optical members are formed into a cylindrical shape.

29. The optical lens according to claim 25, wherein said columnar optical members are formed into a semi-cylindrical shape, with the outer face on the side opposite said curved surface formed into a plane.

30. The optical lens according to claim 29, wherein a pair of planar side faces are formed between said curved surface and the outer surface on the side opposite said curved surface of each of said columnar optical members, and said first optical member array is arranged with each of said planar side faces of said columnar optical members in mutual contact.

31. The optical lens according to claim 25, wherein said second optical member is formed into a cylindrical shape.

32. The optical lens according to claim 25, wherein said second optical member is formed into a semi-cylindrical shape, with the outer face on the side opposite said curved surface formed into a plane.

33. The optical lens according to claim 25, further having a pair of rolling prevention means, provided on both end portions of the second optical member, to prevent rolling of said second optical member.

34. The optical lens according to claim 33, wherein said pair of rolling prevent means each has a contact face formed from a plane.

35. A semiconductor laser apparatus, comprising:
a semiconductor laser array, in which a plurality of light-emitting portions are arranged in an array;
light parallelizing means, placed opposing said semiconductor laser array, and which parallelizes and emits light rays emitted from said plurality of light-emitting portions; and,
a condensing optical system, which condenses and outputs light emitted by said light parallelizing means;
wherein said light parallelizing means is an optical lens according to claim 25, and the direction of arrangement of said plurality of light-emitting portions in said semiconductor laser array and the direction of arrangement of said plurality of columnar optical members in said optical lens are parallel.

* * * * *